United States Patent
Nakamoto

(10) Patent No.: US 8,279,375 B2
(45) Date of Patent: Oct. 2, 2012

(54) DISPLAY APPARATUS, DRIVING APPARATUS OF DISPLAY APPARATUS, AND ELECTRONIC DEVICE

(75) Inventor: Tatsuya Nakamoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 249 days.

(21) Appl. No.: 12/449,992

(22) PCT Filed: Jan. 23, 2008

(86) PCT No.: PCT/JP2008/050910
§ 371 (c)(1),
(2), (4) Date: Sep. 4, 2009

(87) PCT Pub. No.: WO2008/129886
PCT Pub. Date: Oct. 30, 2008

(65) Prior Publication Data
US 2010/0033655 A1 Feb. 11, 2010

(30) Foreign Application Priority Data
Apr. 16, 2007 (JP) .................................. 2007-107556

(51) Int. Cl.
*G02F 1/1347* (2006.01)
*G02F 1/1335* (2006.01)
(52) U.S. Cl. ............................................. 349/81; 349/8
(58) Field of Classification Search .................... 349/81, 349/8
See application file for complete search history.

(56) References Cited

U.S. PATENT DOCUMENTS

| | | | |
|---|---|---|---|
| 5,091,784 A | 2/1992 | Someya et al. | |
| 5,303,073 A | 4/1994 | Shirota et al. | |
| 5,842,762 A | * 12/1998 | Clarke | 353/122 |
| 6,407,726 B1 | * 6/2002 | Endo et al. | 345/87 |
| 6,545,653 B1 | * 4/2003 | Takahara et al. | 345/87 |
| 6,661,488 B1 | 12/2003 | Takeda et al. | |
| 6,724,452 B1 | 4/2004 | Takeda et al. | |
| 7,167,224 B1 | 1/2007 | Takeda et al. | |

(Continued)

FOREIGN PATENT DOCUMENTS

JP 63-025629 2/1988

(Continued)

OTHER PUBLICATIONS

International Search Report.

*Primary Examiner* — K. Cyrus Kianni
(74) *Attorney, Agent, or Firm* — Harness, Dickey & Pierce, P.L.C.

(57) ABSTRACT

In one embodiment of the present invention, a liquid crystal apparatus includes first and second transmissive liquid crystal panels which are combined with each other. Each of the liquid crystal panels displays a video image in accordance with an identical video source. The first liquid crystal panel is driven by an interlace method in which a video image corresponding to one frame is displayed in two fields while the second liquid crystal panel is driven by a progressive method in which a video image corresponding to one frame is displayed in one field. Accordingly, the display apparatus has high display quality and no interference fringes. This attains a liquid crystal display apparatus with high display quality since the liquid crystal display apparatus has no interference fringes even if a plurality of transmissive liquid crystal display panels are combined with each other.

8 Claims, 18 Drawing Sheets

U.S. PATENT DOCUMENTS

| | | |
|---|---|---|
| 7,224,421 B1 | 5/2007 | Takeda et al. |
| 7,227,606 B2 | 6/2007 | Takeda et al. |
| 7,304,703 B1 | 12/2007 | Takeda et al. |
| 2002/0047855 A1* | 4/2002 | Aoki et al. ................... 345/698 |
| 2003/0090597 A1* | 5/2003 | Katoh et al. ................. 348/744 |
| 2004/0046705 A1* | 3/2004 | Masazumi et al. ............ 345/1.1 |
| 2004/0119924 A1 | 6/2004 | Takeda et al. |
| 2004/0252257 A1 | 12/2004 | Wen et al. |
| 2005/0041179 A1 | 2/2005 | Suzuki |
| 2006/0114207 A1* | 6/2006 | Lee et al. ........................ 345/89 |
| 2006/0125745 A1 | 6/2006 | Evanicky |
| 2007/0064187 A1 | 3/2007 | Takeda et al. |
| 2008/0165314 A1 | 7/2008 | Takeda et al. |
| 2008/0303997 A1 | 12/2008 | Takeda et al. |
| 2009/0051707 A1 | 2/2009 | Hirata et al. |
| 2009/0147186 A1 | 6/2009 | Nakai et al. |

FOREIGN PATENT DOCUMENTS

| | | |
|---|---|---|
| JP | 64-049021 | 2/1989 |
| JP | 01-222586 | 9/1989 |
| JP | 01-277215 | 11/1989 |
| JP | 02-000023 | 1/1990 |
| JP | 02-253231 | 10/1990 |
| JP | 03-094589 | 4/1991 |
| JP | 04-079330 | 7/1992 |
| JP | 05-002194 | 1/1993 |
| JP | 05-088197 | 4/1993 |
| JP | 05-142519 | 6/1993 |
| JP | 05-257124 | 10/1993 |
| JP | 06-186583 | 7/1994 |
| JP | 08-076139 | 3/1996 |
| JP | 08-292429 | 11/1996 |
| JP | 08-305301 | 11/1996 |
| JP | 10-254376 | 9/1998 |
| JP | 11-167106 | 6/1999 |
| JP | 11-271709 | 10/1999 |
| JP | 2001-083523 | 3/2001 |
| JP | 2001-188120 | 7/2001 |
| JP | 2002-090536 | 3/2002 |
| JP | 2003-020255 | 1/2003 |
| JP | 2003-040649 | 2/2003 |
| JP | 2003-149730 | 5/2003 |
| JP | 2003-279963 | 10/2003 |
| JP | 2004-013121 | 1/2004 |
| JP | 3523239 | 2/2004 |
| JP | 3524540 | 2/2004 |
| JP | 2004-309553 | 11/2004 |
| JP | 2004-357253 | 12/2004 |
| JP | 2005-164692 | 6/2005 |

* cited by examiner

FIG. 7
(a)
EVEN-NUMBERED FIELD
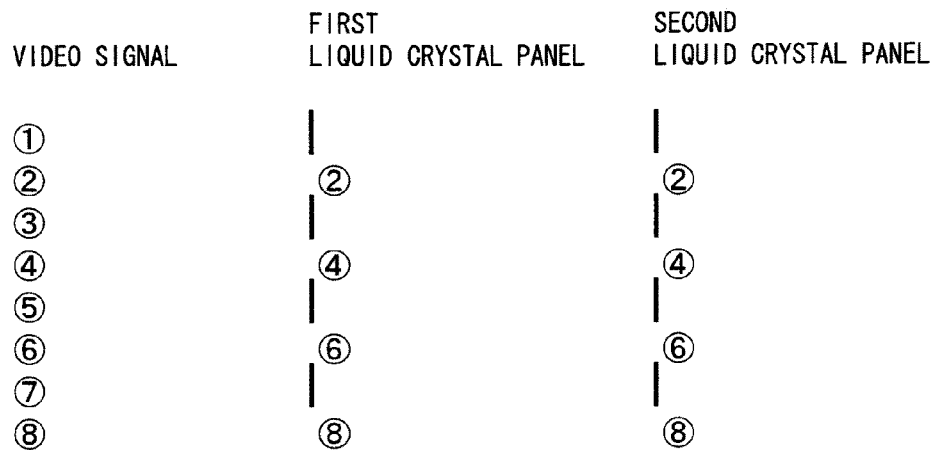
(b)
ODD-NUMBERED FIELD
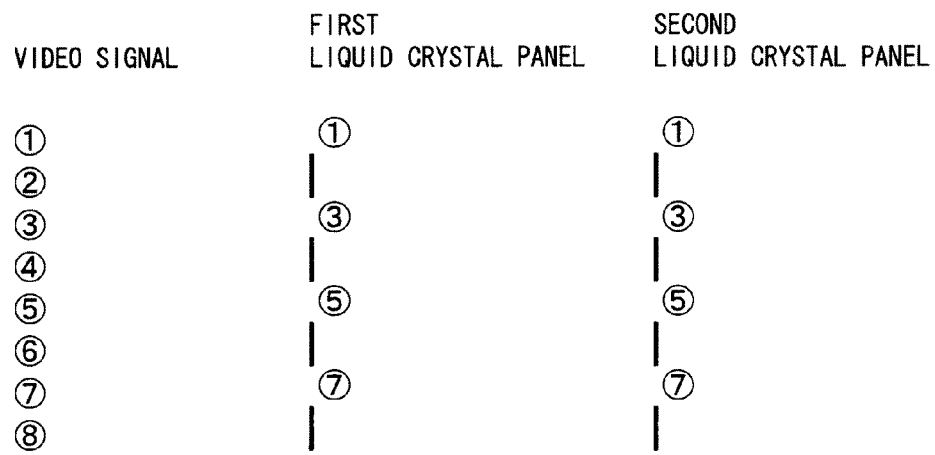

FIG. 8 (a)
RESULTANT VIDEO IMAGE
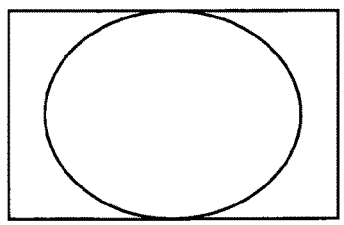
FIG. 8 (b)
EVEN-NUMBERED FIELD
SECOND
LIQUID CRYSTAL PANEL
FIRST
LIQUID CRYSTAL PANEL
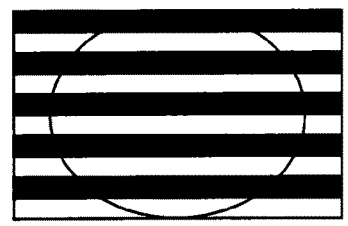
FIG. 8 (c)
ODD-NUMBERED FIELD
SECOND
LIQUID CRYSTAL PANEL
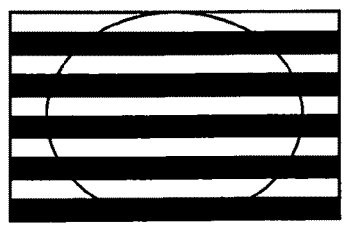
FIRST
LIQUID CRYSTAL PANEL

FIG. 9
(a)
EVEN-NUMBERED FIELD
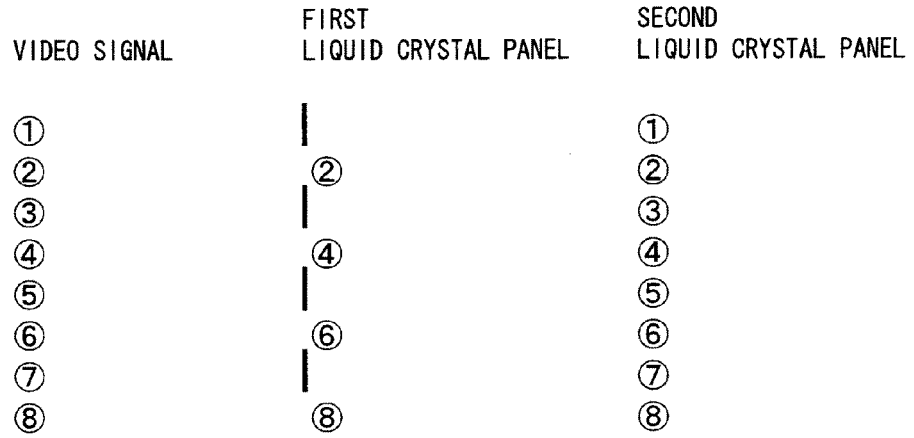
(b)
ODD-NUMBERED FIELD
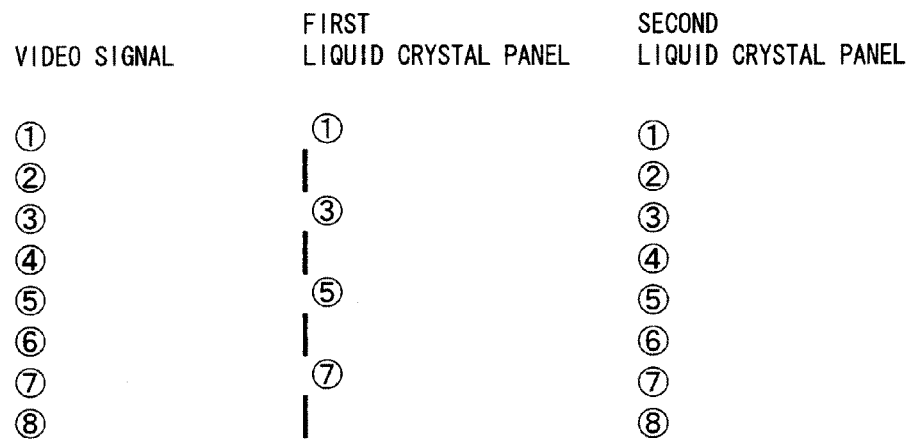

FIG. 10 (a)
RESULTANT VIDEO IMAGE
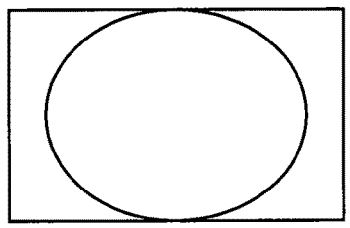
FIG. 10 (b)
EVEN-NUMBERED FIELD
SECOND                    FIRST
LIQUID CRYSTAL PANEL      LIQUID CRYSTAL PANEL
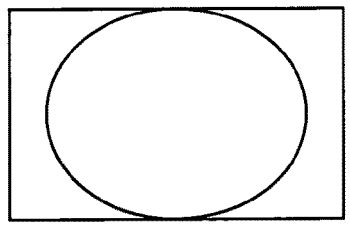    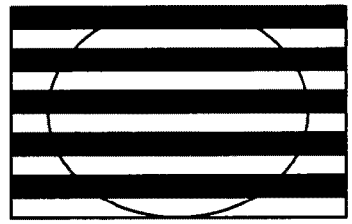
FIG. 10 (c)
ODD-NUMBERED FIELD
SECOND                    FIRST
LIQUID CRYSTAL PANEL      LIQUID CRYSTAL PANEL
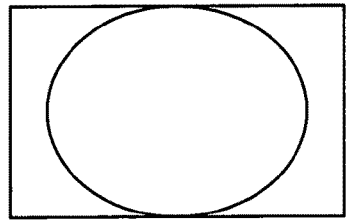    

EVEN-NUMBERED FIELD

| VIDEO SIGNAL | FIRST LIQUID CRYSTAL PANEL | SECOND LIQUID CRYSTAL PANEL |
|---|---|---|
| ① | | ② |
| ② | ② | ② |
| ③ | | ④ |
| ④ | ④ | ④ |
| ⑤ | | ⑥ |
| ⑥ | ⑥ | ⑥ |
| ⑦ | | ⑧ |
| ⑧ | ⑧ | ⑧ |

(b)

ODD-NUMBERED FIELD

| VIDEO SIGNAL | FIRST LIQUID CRYSTAL PANEL | SECOND LIQUID CRYSTAL PANEL |
|---|---|---|
| ① | ① | ① |
| ② | | ① |
| ③ | ③ | ③ |
| ④ | | ③ |
| ⑤ | ⑤ | ⑤ |
| ⑥ | | ⑤ |
| ⑦ | ⑦ | ⑦ |
| ⑧ | | ⑦ |

FIG. 12 (a)
RESULTANT VIDEO IMAGE
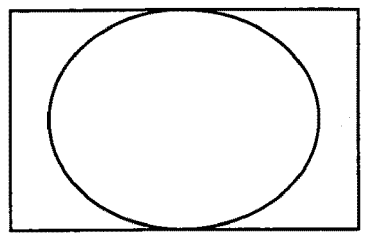
FIG. 12 (b)
EVEN-NUMBERED FIELD
SECOND LIQUID CRYSTAL PANEL FIRST LIQUID CRYSTAL PANEL
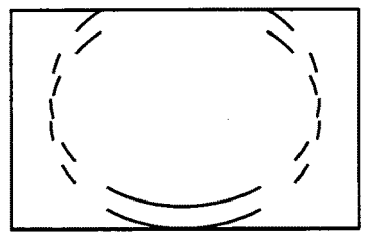 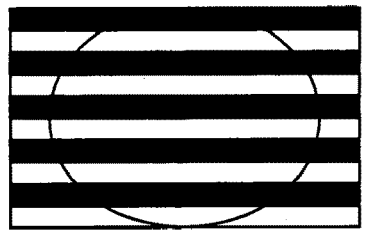
FIG. 12 (c)
ODD-NUMBERED FIELD
SECOND LIQUID CRYSTAL PANEL FIRST LIQUID CRYSTAL PANEL
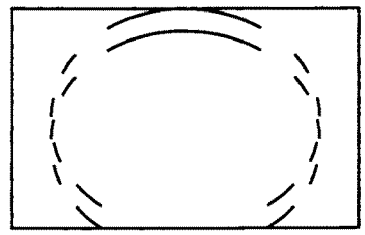 

DISPLAY APPARATUS, DRIVING APPARATUS OF DISPLAY APPARATUS, AND ELECTRONIC DEVICE

TECHNICAL FIELD

The present invention relates to a display apparatus in which two or more transmissive display panels are combined with each other. In particular, the present invention relates to a display apparatus in which two or more transmissive liquid crystal panels are combined with each other.

BACKGROUND ART

There exist various techniques for improving the contrast of a liquid crystal display apparatus. The following examples are disclosed in Patent Literatures 1 through 7.

Patent Literature 1 discloses a technique of improving a contrast ratio by appropriately setting the content and the specific surface area of a yellow pigment in a color filter. According to this technique, pigment molecules of the color filter scatter and depolarize polarized light. This makes it possible to remedy a problem of a decrease in the contrast ratio of a liquid crystal display apparatus. The technique disclosed in Patent Literature 1 reveals that the contrast ratio of a liquid crystal display apparatus improves from 280 to 420.

Patent Literature 2 discloses a technique of improving a contrast ratio by increasing the transmittance and the polarization degree of a polarization plate. The technique disclosed in Patent Literature 2 reveals that the contrast ratio of a liquid crystal display apparatus improves from 200 to 250.

Patent Literatures 3 and 4 disclose a technique for improving contrast in a guest-host type which exploits a light-absorbing property which a dichroic pigment has.

Patent Literature 3 describes a method for improving contrast by a structure in which a quarter-wave plate is sandwiched between two guest-host liquid crystal cells. Patent Literature 3 discloses that no polarization plate is used.

Patent Literature 4 discloses a liquid crystal display element in which a dichroic pigment is mixed with a liquid crystal used in a dispersed liquid crystal type. Patent Literature 4 discloses a contrast ratio of 101.

The techniques disclosed in Patent Literatures 3 and 4, however, show lower contrast than those of the other Patent Literatures. To further improve the contrast, it is necessary to take various measures: an improvement in the light-absorbing property of the dichroic pigment, an increase in the content of pigment, and an increase in the thickness of the guest-host liquid crystal cell(s). All these measures, however, would lead to new technical problems, such as a poor reliability and a poor response property.

Each of Patent Literatures 5 and 6 discloses a method for improving contrast by use of an optical compensation type in which a liquid crystal panel and a liquid crystal display panel are provided between a pair of polarization plates. The liquid crystal panel performs optical compensation.

In Patent Literature 5, retardation is adjusted in an STN type by using a display cell and a liquid crystal cell for optical compensation. This improves a contrast ratio from 14 to 35.

In Patent Literature 6, a contrast ratio is improved from 8 to 100 by disposing a liquid crystal cell for optical compensation. The liquid crystal cell compensates for wavelength dependence of a liquid crystal display cell of, for example, a TN type, which wavelength dependence occurs while the liquid crystal display cell is displaying black.

Although the techniques disclosed in the Patent Literatures achieve a 1.2 to 10 fold or even greater increase in contrast ratio, the absolute value of the contrast ratio is merely in a range of about 35 to 420.

Another contrast enhancing technique is disclosed in Patent Literature 7, for example. The Patent Literature 7 teaches a complex liquid crystal display apparatus in which two liquid crystal panels are combined whose polarization plates form crossed Nicols. Patent Literature 7 discloses that the combined two panels increase the contrast ratio up to three to four digits. Note that each of the combined two panels, if used alone, merely showed a contrast ratio of 100.

Citation List

Patent Literature 1

Japanese Unexamined Patent Application Publication, Tokukai, No. 2001-188120 A (Publication Date: Jul. 10, 2001)

Patent Literature 2

Japanese Unexamined Patent Application Publication, Tokukai, No. 2002-90536 A (Publication Date: Mar. 27, 2002)

Patent Literature 3

Japanese Unexamined Patent Application Publication, Tokukaisho, No. 63-25629 A (Publication Date: Feb. 3, 1988)

Patent Literature 4

Japanese Unexamined Patent Application Publication, Tokukaihei, No. 5-2194 A (Publication Date: Jan. 8, 1993)

Patent Literature 5

Japanese Unexamined Patent Application Publication, Tokukaisho, No. 64-49021 A (Publication Date: Feb. 23, 1989)

Patent Literature 6

Japanese Unexamined Patent Application Publication, Tokukaihei, No. 2-23 A (Publication Date: Jan. 5, 1990)

Patent Literature 7

Japanese Unexamined Patent Application Publication, Tokukaihei, No. 5-88197 A (Publication Date: Apr. 9, 1993)

SUMMARY OF INVENTION

In a case where two liquid crystal panels of a liquid crystal display apparatus as the one disclosed in Patent Literature 7 in which two liquid crystal panels are combined are driven by an interlaced method in which a video signal corresponding to one frame is made up of two fields, each of the two liquid crystal panels scans an even-numbered field (see FIG. 8(b)) and an odd-numbered field (see FIG. 8(c)), thereby displaying a video image (see FIG. 8(a)).

In a case where both the combined two liquid crystal panels are transmissive liquid crystal panels, the interlaced method cause (i) lines displaying black (shielding lines) and (ii) lines displaying a video image (transmissive lines) to be alternated on each of the combined two liquid crystal panels (see FIG. 8(b) and FIG. 8(c)). Each of the lines functions as a slit in an even-numbered field and in an odd-numbered field (see (a) and (b) of FIG. 7).

In a case where a slit of the first liquid crystal panel and a slit of the second liquid crystal panel overlap each other, interference fringes are caused. This causes a problem of deterioration in display quality of a liquid crystal display apparatus. That is, in a case where two liquid crystal panels driven by the interlaced method are combined in a liquid crystal display apparatus, interference fringes occur, thereby deteriorating a display quality.

The present invention was made in view of the problem.

An object of the present invention is to realize a display apparatus, having a high display quality, in which no interference fringe occurs even in a case where a plurality of transmissive display panels are combined with each other.

In order to attain the object, a display apparatus of the present invention is a display apparatus in which two or more transmissive display panels are combined with each other, each of which displays a video image in accordance with an identical video source, wherein one of the two or more transmissive display panels is driven by an interlaced method in which a video image corresponding to one frame is displayed in a plurality of fields while the others of the two or more transmissive display panels are driven by a progressive method in which a video image corresponding to one frame is displayed in one field.

According to the arrangement, one of the combined display panels is driven by the interlaced method while all the rest are driven by the progressive method. That is, only one display panel is driven by the interlaced method in the display apparatus.

Furthermore, each display panel driven by the progressive method displays during one field period video images on lines which do not contribute to image display on the display panel driven by the interlaced method.

Accordingly, each display panel driven by the progressive method does not have a part which functions as a slit, unlike the display panel driven by the interlaced method.

This eliminates occurrence of interference fringes which are caused in a case where a plurality of display panels driven by the interlaced method are combined with each other, even if the display panel driven by the progressive method is combined with the display panel driven by the interlaced method. This eliminates deterioration in display quality due to interference fringes. As a result, it is possible to improve display quality.

The display apparatus can be arranged such that, in a case where one frame is made up of N fields in the one of the two or more transmissive display panels, information corresponding to one field of one frame in the one of the two or more transmissive display panels is supplied, in a 1/N frame period by N lines, to lines of each of the others of the two or more transmissive display panels.

The display apparatus can include signal conversion processing means, in a case where the video source is a video signal complying with the interlaced method in which one frame is made up of a plurality of fields, for converting the video signal into a video signal complying with the progressive method to be supplied to each of the others of the two or more transmissive display panels.

The display apparatus can be arranged such that, in a case where one frame of the video signal is made up of N fields, the signal conversion processing means supplies a video signal corresponding to one field, in a 1/N frame period by N lines, to each of the others of the two or more transmissive display panels.

The display apparatus can be arranged such that each of the two or more transmissive display panels is a liquid crystal panel; and polarized light absorbing layers are provided so that each of the two or more liquid crystal panels is sandwiched between corresponding two of the polarized light absorbing layers which form crossed Nicols.

With regard to a front direction, according to the arrangement, leakage of light in a direction of a transmission axis of a polarized light absorbing layer can be blocked by an absorption axis of an adjacent polarized light absorbing layer. With regard to an oblique direction, according to the arrangement, an increase in amount of light due to light leakage is not observed even if a Nicol angle which is a crossing angle formed between respective polarization axes of two adjacent polarized light absorbing layers. In other words, graying of black is unlikely to occur even if a Nicol angle is increased when viewed from an oblique direction.

At least three polarized light absorbing layers are provided in a case where two or more liquid crystal panels are combined with each other and each of the liquid crystal panels is sandwiched between two polarized light absorbing layers between which crossed Nicols are formed. That is, by providing three polarized light absorbing layers so that crossed Nicols are formed between two adjacent polarized light absorbing layers, it is possible to achieve drastic improvement of a shutter capability with regard to both the front direction and the oblique direction. This makes it possible to drastically improve contrast. By causing each of the combined liquid crystal panels to display a video image in accordance with a display signal, it is possible to further improve contrast.

This makes it possible to improve both contrast and display quality.

A driving apparatus of the present invention is an apparatus for driving a display apparatus in which two or more transmissive display panels are combined with each other, each of which displays a video image in accordance with an identical video source, said apparatus comprising driving means for causing (i) one of the two or more transmissive display panels to be driven by an interlaced method in which a video image corresponding to one frame is displayed in a plurality of fields and (ii) the others of the two or more transmissive display panels to be driven by a progressive method in which a video image corresponding to one frame is displayed in one field.

An electronic device of the present invention includes the display apparatus thus arranged.

This makes it possible to provide an electronic device that can display a video image with a high display quality.

BRIEF DESCRIPTION OF DRAWINGS

FIG. 1 is a schematic cross-sectional view illustrating a liquid crystal display apparatus of an embodiment of the present invention.

FIG. 2 is a view illustrating positional relations among polarization plates and panels of the liquid crystal display apparatus illustrated in FIG. 1.

FIG. 3 is a plan view illustrating a vicinity of a pixel electrode of the liquid crystal display apparatus illustrated in FIG. 1.

FIG. 4 is a schematic block diagram illustrating a drive system for driving the liquid crystal display apparatus illustrated in FIG. 1.

FIG. 5 is a view illustrating connection relations between drivers and panel drive circuits of the liquid crystal display apparatus illustrated in FIG. 1.

FIG. 6 is a schematic block diagram illustrating a backlight of the liquid crystal display apparatus illustrated in FIG. 1.

FIGS. 7

(a) and (b) of FIG. 7 are tables showing, for two fields, scanned statuses of two liquid crystal panels.

FIG. 8(a)

FIG. 8(a) is a view illustrating a video image.

FIG. 8(b)

FIG. 8(b) is a view illustrating, for one field, display statuses of the two liquid crystal panels.

FIG. 8(c)

FIG. 8(c) is a view illustrating, for the other field, display statuses of the two liquid crystal panels.

FIGS. 9

(a) and (b) of FIG. 9 are tables showing, for two fields, scanned statuses of the two liquid crystal panels.

FIG. 10(a)

FIG. 10(a) is a view illustrating a video image.

FIG. 10(b)

FIG. 10(b) is a view illustrating, for one field, display statuses of the two liquid crystal panels.

FIG. 10(c)

FIG. 10(c) is a view illustrating, for the other field, display statuses of the two liquid crystal panels.

FIGS. 11

(a) and (b) of FIG. 11 are tables showing, for two fields, scanned statuses of the two liquid crystal panels.

FIG. 12(a)

FIG. 12(a) is a view illustrating a video image.

FIG. 12(b)

FIG. 12(b) is a view illustrating, for one field, display statuses of the two liquid crystal panels.

FIG. 12(c)

FIG. 12(c) is a view illustrating, for the other field, display statuses of the two liquid crystal panels.

FIG. 13

Figure 1:
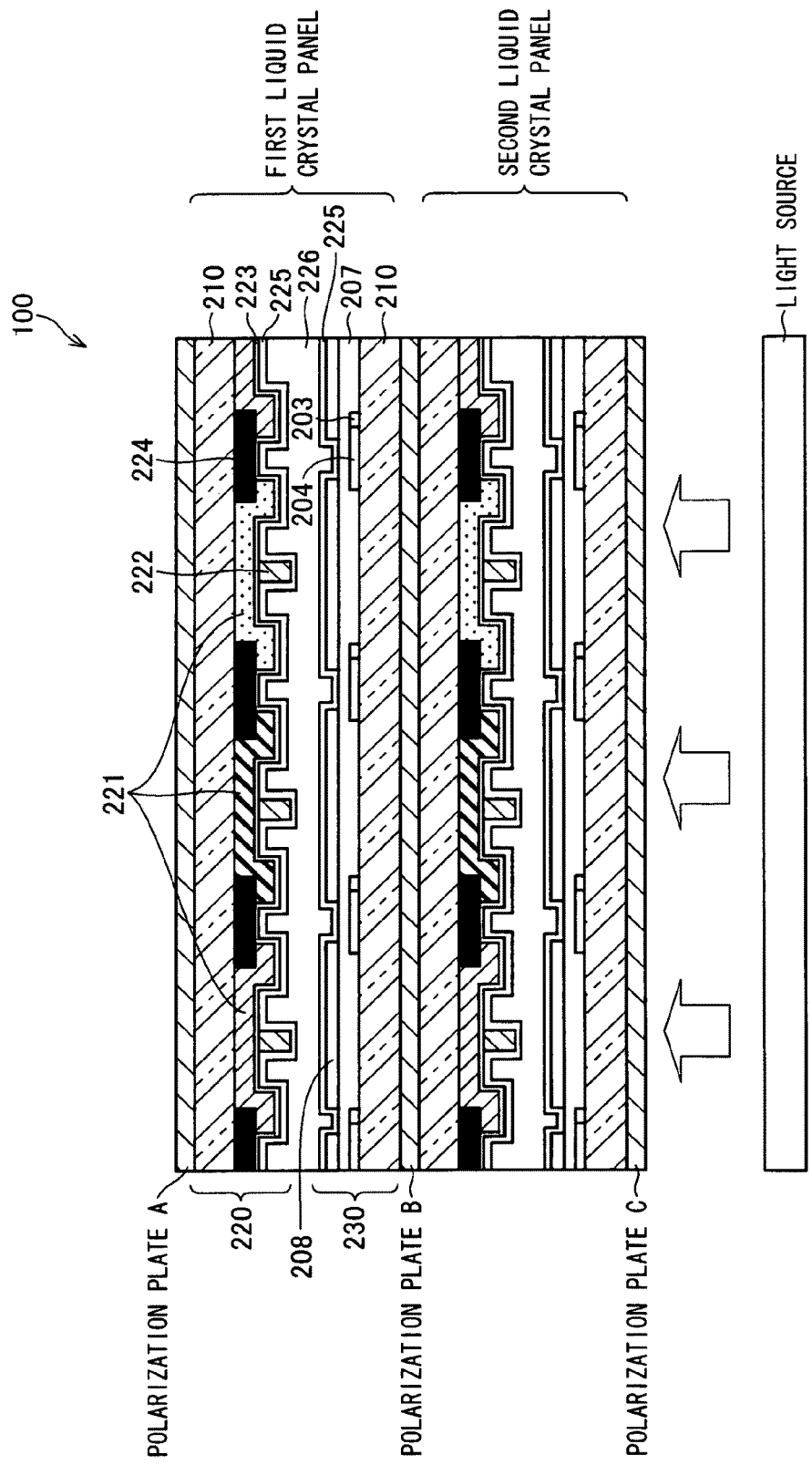
FIG. 1
Figure 13:
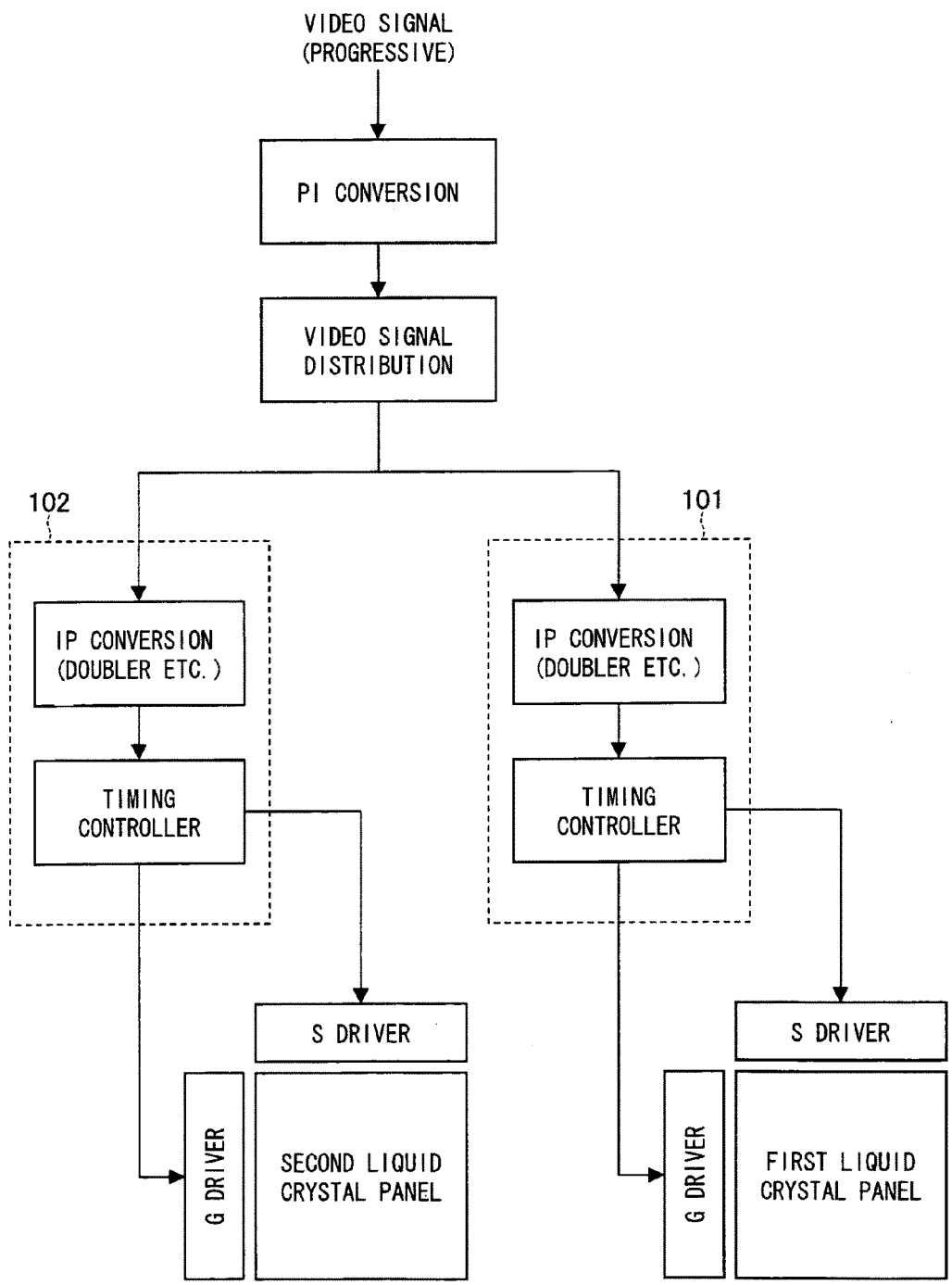

FIG. 13 is a block diagram illustrating one example of a drive circuit for driving the liquid crystal display apparatus illustrated in FIG. 1.

FIG. 14

Figure 14:
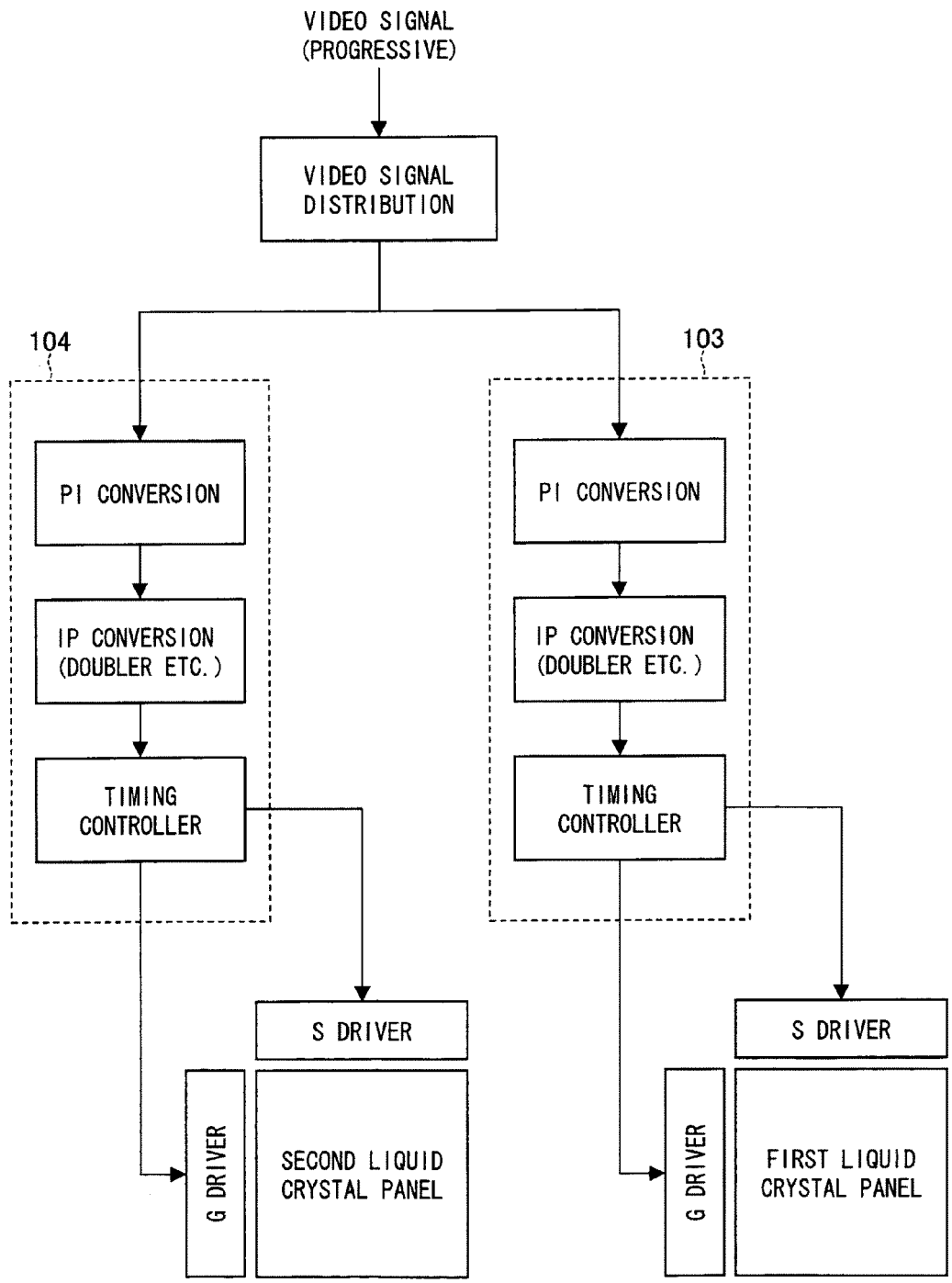

FIG. 14 is a block diagram illustrating another example of a drive circuit for driving the liquid crystal display apparatus illustrated in FIG. 1.

FIG. 15

Figure 15:
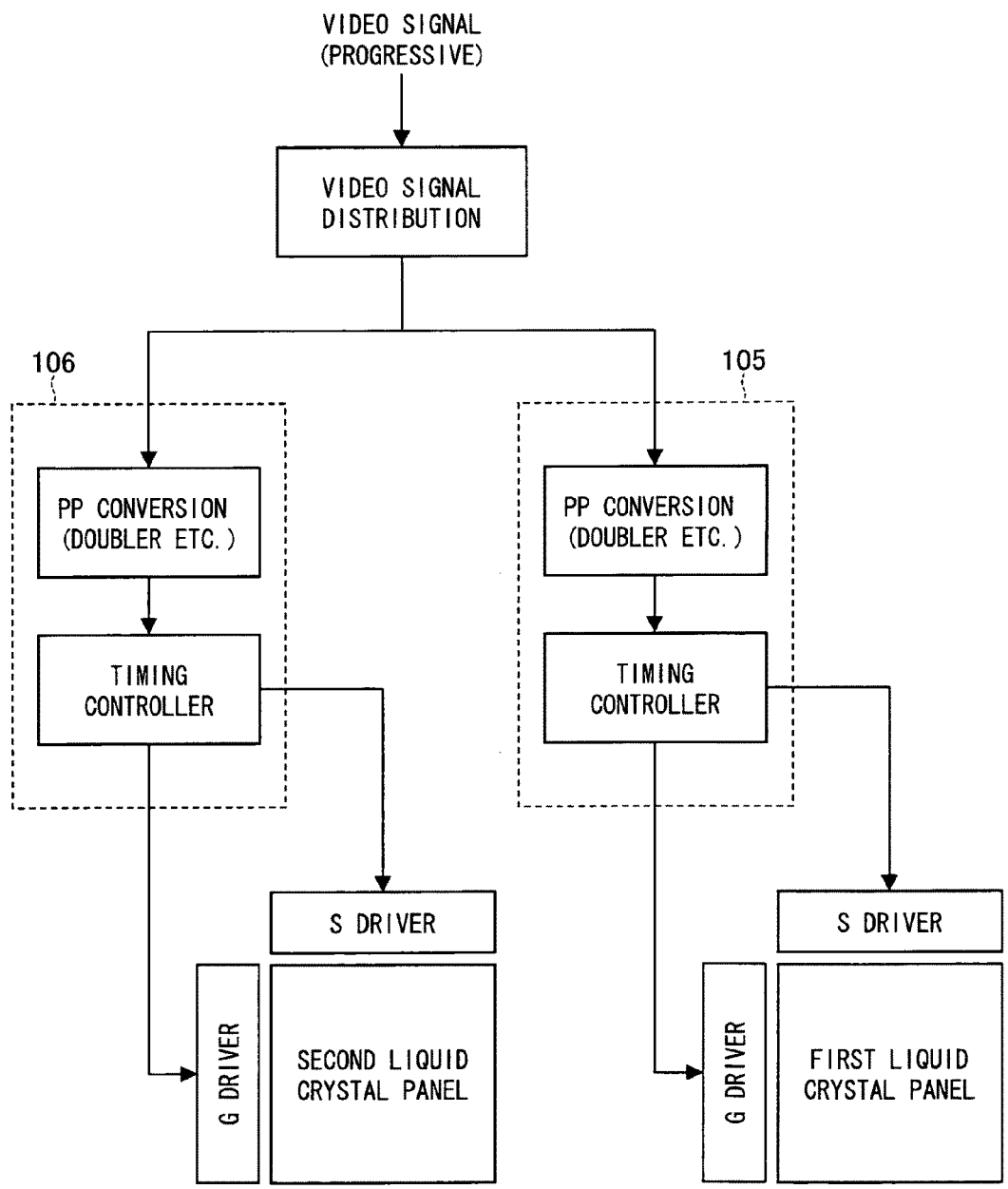

FIG. 15 is a block diagram illustrating still another example of a drive circuit for driving the liquid crystal display apparatus illustrated in FIG. 1.

FIG. 16

Figure 16:
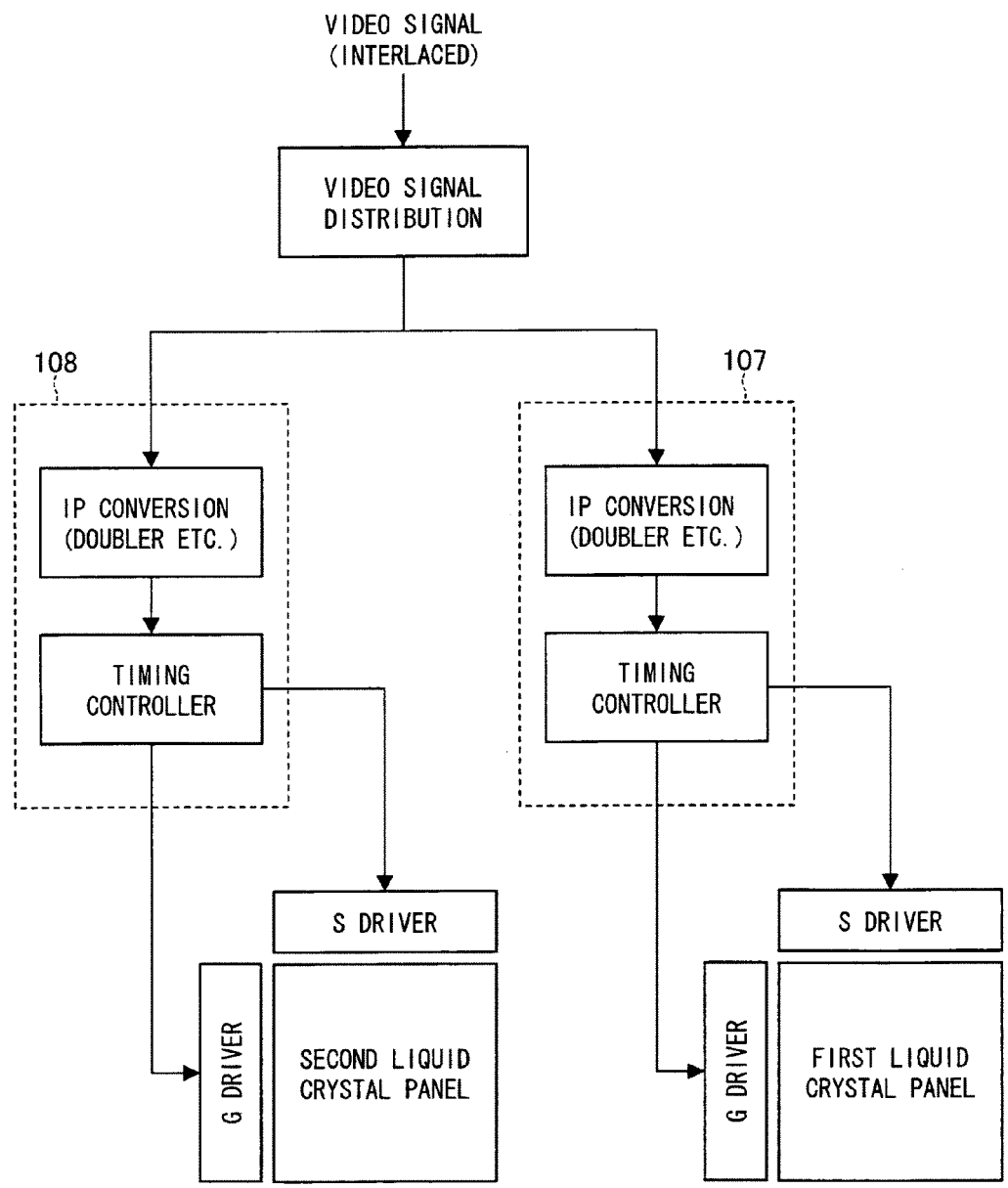

FIG. 16 is a block diagram illustrating yet another example of a drive circuit for driving the liquid crystal display apparatus illustrated in FIG. 1.

FIG. 17

Figure 17:
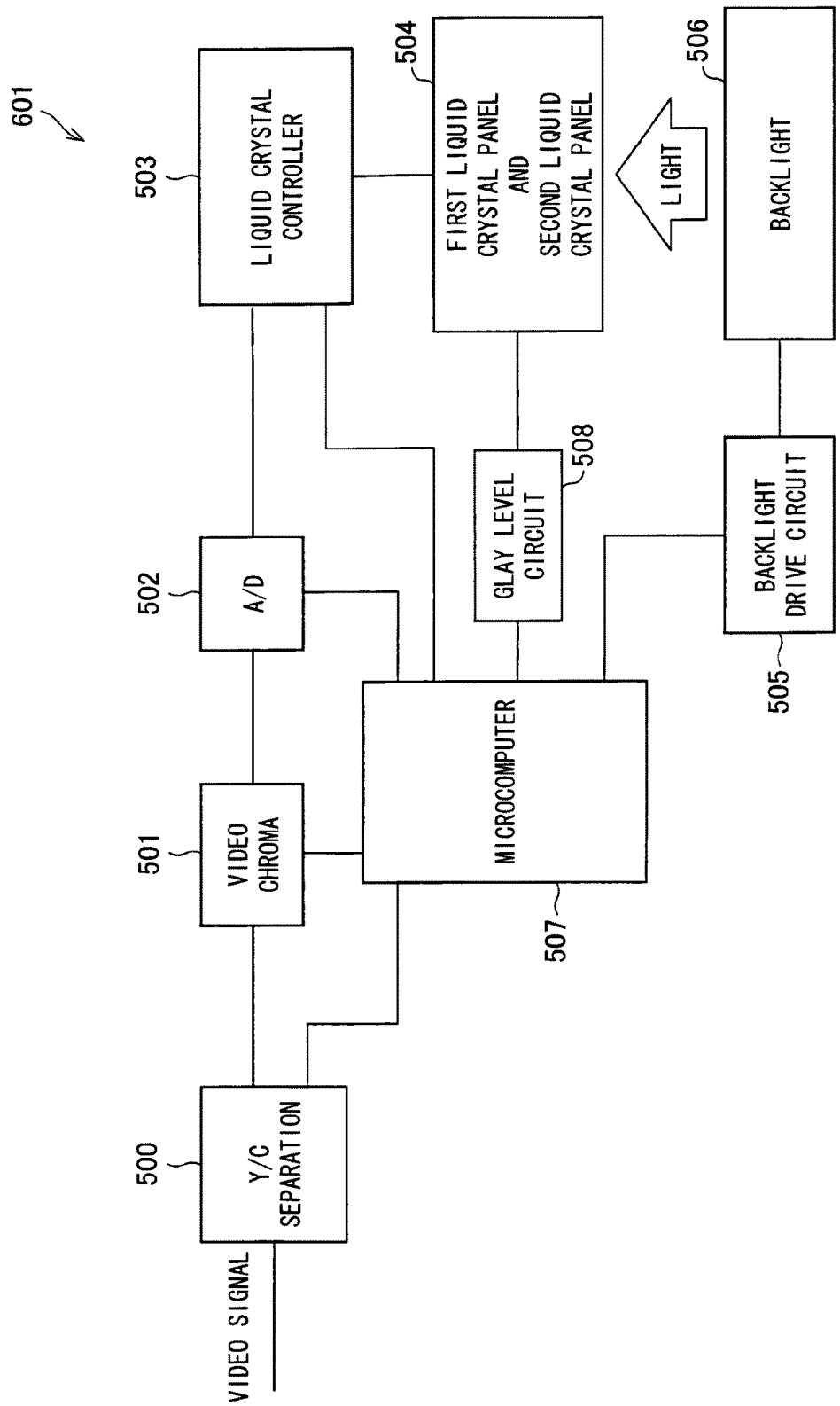

FIG. 17 is a schematic block diagram illustrating a television receiver including the liquid crystal display apparatus of the present invention.

FIG. 18

Figure 18:

FIG. 18 is a block diagram illustrating a relation between a tuner section and the liquid crystal display apparatus of the television receiver illustrated in FIG. 17.

FIG. 19

Figure 19:
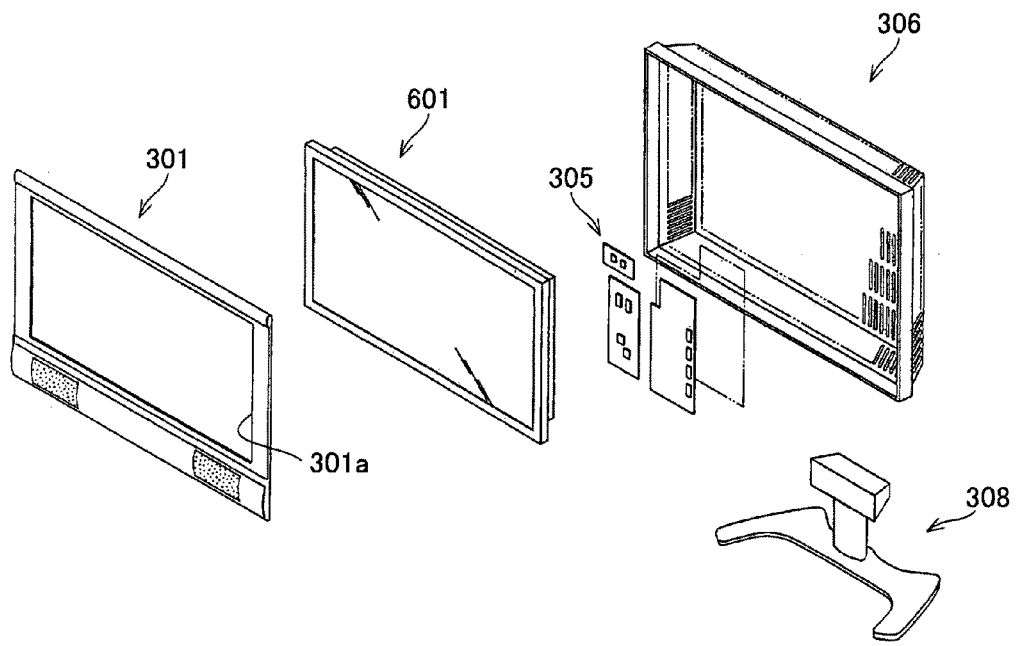

FIG. 19 is an exploded perspective view illustrating the television receiver illustrated in FIG. 17.

DESCRIPTION OF EMBODIMENTS

The following describes an embodiment of the present invention.

The present embodiment deals with a liquid crystal display apparatus in which two transmissive liquid crystal panels are combined with each other, each of the transmissive liquid crystal display panels being used as a transmissive display panel.

FIG. 1 is a schematic cross-sectional view illustrating a liquid crystal display apparatus 100 of the present embodiment.

The liquid crystal display apparatus 100 includes (i) a first liquid crystal panel and a second liquid crystal panel and (ii) polarization plates A, B and C, is arranged such that the panels and the polarization plates are combined alternately as illustrated in FIG. 1. Note that both the first and second liquid crystal panels are transmissive display panels.

Figure 2:
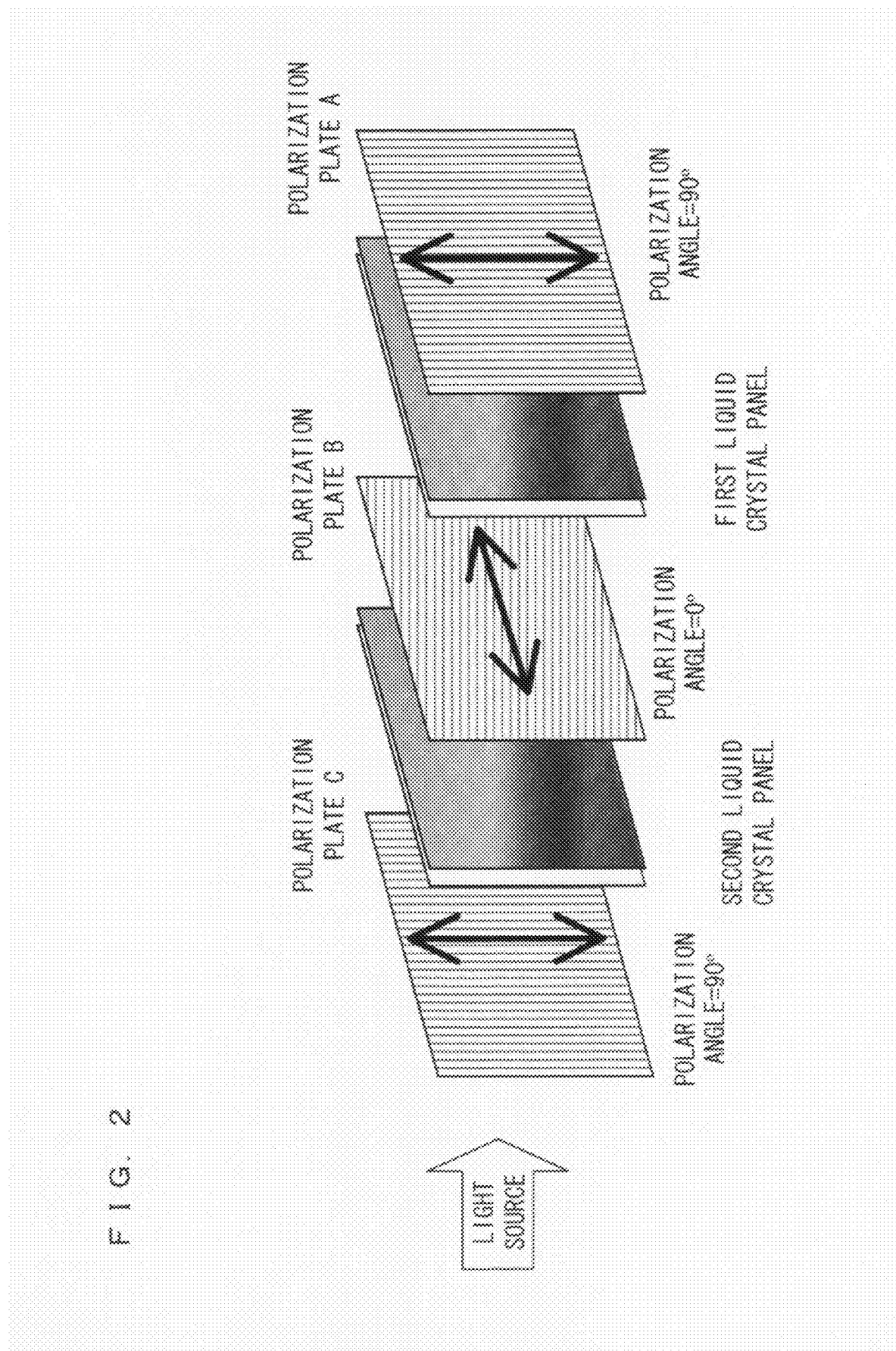
FIG. 2

FIG. 2 is a view illustrating an arrangement of the polarization plates and the liquid crystal panels in the liquid crystal display apparatus 100 illustrated in FIG. 1. In FIG. 2, the polarization plates A, B, and C are provided so that the polarization axis of the polarization plate B is perpendicular to those of the polarization plates A and C. That is, the polarization plates A and B are provided so as to form crossed Nicols, and the polarization plates B and C are provided so as to form crossed Nicols.

Each of the first and second liquid crystal panels is arranged so that liquid crystal is sealed between a pair of transparent substrates (a color filter substrate 220 and an active matrix substrate 230). Each of the first and second liquid crystal panels electrically changes an alignment of the liquid crystal so as to freely switch states among (i) a state in which polarized light incident on the polarization plate A from the light source is rotated by approximately 90°; (ii) a state in which the polarized light is not rotated; and (iii) an intermediate state between the states (i) and (ii).

The first and second liquid crystal panels each include a color filter and are capable of displaying an image using a plurality of pixels. This display function is achieved by some display types: TN (Twisted Nematic) type, VA (Vertical Alignment) type, IPS (In Plain Switching) type, FFS (Fringe Field Switching) type, and combinations of these types. Among these types, VA is suitable since the type alone exhibits high contrast. Although the description here will focus on MVA (Multidomain Vertical Alignment) type, which is encompassed in the VA type, IPS and FFS types are also sufficiently effective because both operate in normally black type. The liquid crystal is driven by an active matrix driving using TFTs (Thin Film Transistors). As to a detailed description of MVA manufacturing methods, see Japanese Unexamined Patent Application Publication, Tokukaihei, No. 13-83523 A, for example.

The first and second liquid crystal panels in the liquid crystal display apparatus 100 have the same structure. Each of the liquid crystal panels includes the color filter substrate 220 and the active matrix substrate 230 which are provided face to face as aforementioned, and is arranged so that spacers (not illustrated) are provided between the two substrates to maintain a constant distance between the two substrates. The spacers are, for example, plastic beads or resin columns erected on the color filter substrate 220. Liquid crystal 226 is sealed between the pair of substrates (the color filter substrate 220 and the active matrix substrate 230). A vertical alignment film 225 is formed on the surface of each of the substrates which surface comes in contact with the liquid crystal 226. The liquid crystal 226 is a nematic liquid crystal with negative dielectric anisotropy.

The color filter substrate 220 includes a transparent substrate 210. Color filters 221, black matrixes 224, and other components are provided above the transparent substrate 210. Alignment controlling projections 222 which specify an alignment direction of the liquid crystal 226 are provided on a surface of the color filter substrate 220, which surface faces the liquid crystal 226.

Figure 3:
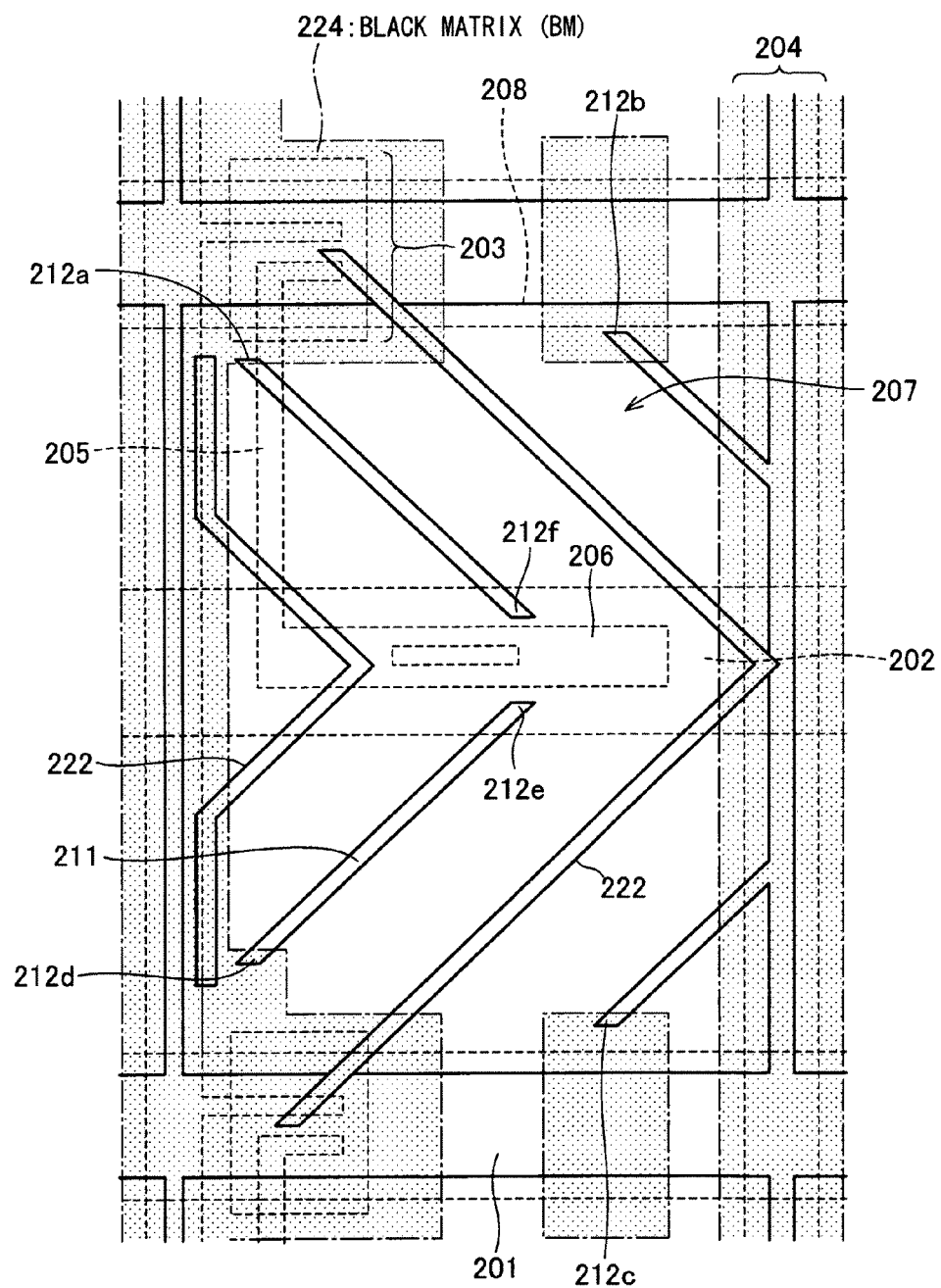
FIG. 3

The active matrix substrate 230 includes the transparent substrate 210. As illustrated in FIG. 3, TFT elements 203, pixel electrodes 208, and other components are provided on the transparent substrate 210. The active matrix substrate 230 is provided also with alignment control slit patterns 211 which specify an alignment direction of the liquid crystal. The alignment controlling projections 222 and the black matrix 224 both illustrated in FIG. 3 are their patterns projected on the active matrix substrate 230 which are formed on the color filter substrate 220. The black matrix 224 is provided for blocking unnecessary light which causes deterioration in display quality.

When a voltage of not less than a threshold voltage is applied to a pixel electrode 208, liquid crystal molecules are inclined in a direction perpendicular to the projections 222 and the slit patterns 211. In the present embodiment, the projections 222 and the slit patterns 211 are formed so that the liquid crystal aligns at an angle of direction of 45° with respect to the polarization axis of the polarization plate.

As described in the foregoing, the first and second liquid crystal panels are arranged so that red (R), green (G), and blue (B) pixels of each of the color filters 221 of the first liquid crystal panel correspond to those of a corresponding color filter 221 of the second liquid crystal panel when they are viewed in a vertical direction. Specifically, the R pixel of a color filter 221 of the first liquid crystal panel corresponds to that of a corresponding color filter 221 of the second liquid crystal panel; the G pixel of a color filter 221 of the first liquid crystal panel corresponds to that of a corresponding color filter 221 of the second liquid crystal panel; and the B pixels of a color filter 221 of the first liquid crystal panel corresponds to that of a corresponding color filter of the second liquid crystal panel, each when they are viewed in a vertical direction.

Figure 4:
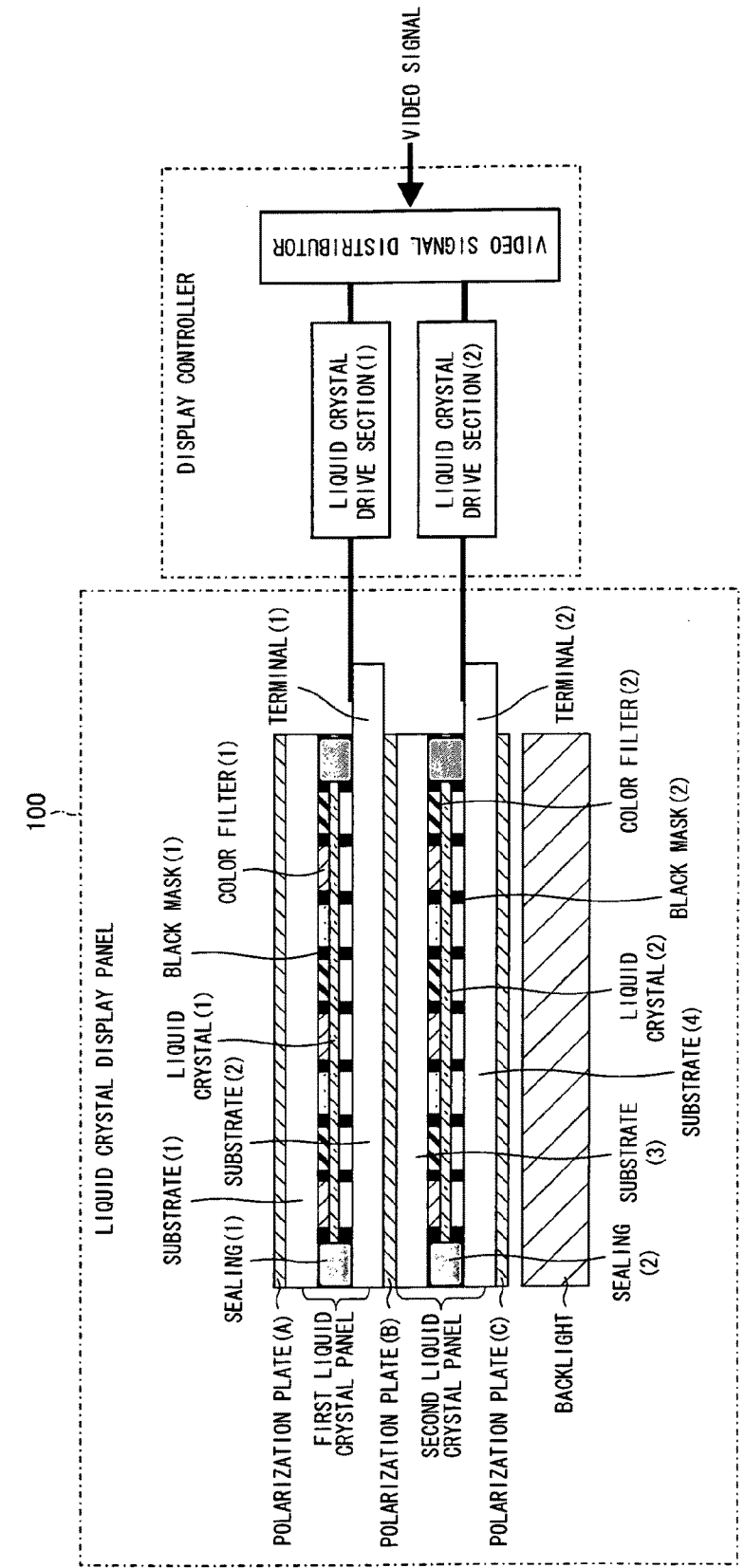
FIG. 4

FIG. 4 is a schematic view illustrating a drive system for the liquid crystal display apparatus 100 having the arrangement.

The drive system includes a display controller required to display a video image on the liquid crystal display apparatus 100.

The display controller causes proper image data to be supplied, in accordance with an input signal (video source), to each of the liquid crystal panels in the liquid crystal display apparatus 100.

The display controller includes liquid crystal drive sections (1) and (2) which drive the first and second liquid crystal panels in accordance with first and second predetermined signals, respectively. The liquid crystal drive sections (1) and (2) serve as first and second liquid crystal panel drive circuits, respectively. The display controller further includes a video signal distributor for distributing to the liquid crystal drive sections (1) and (2) video signals which are video sources. The video signals include (i) a signal directly obtained from a device such as a television receiver, a VTR, or a device having a DVD drive, and (ii) a signal obtained by processing the signal of (i).

The liquid crystal drive sections (1) and (2) in the display controller are devices for transmitting proper electric signals to the liquid crystal panels in accordance with supplied video signals. Each of the liquid crystal drive sections (1) and (2) includes components such as drivers, a circuit board, and a panel drive circuit.

Figure 5:
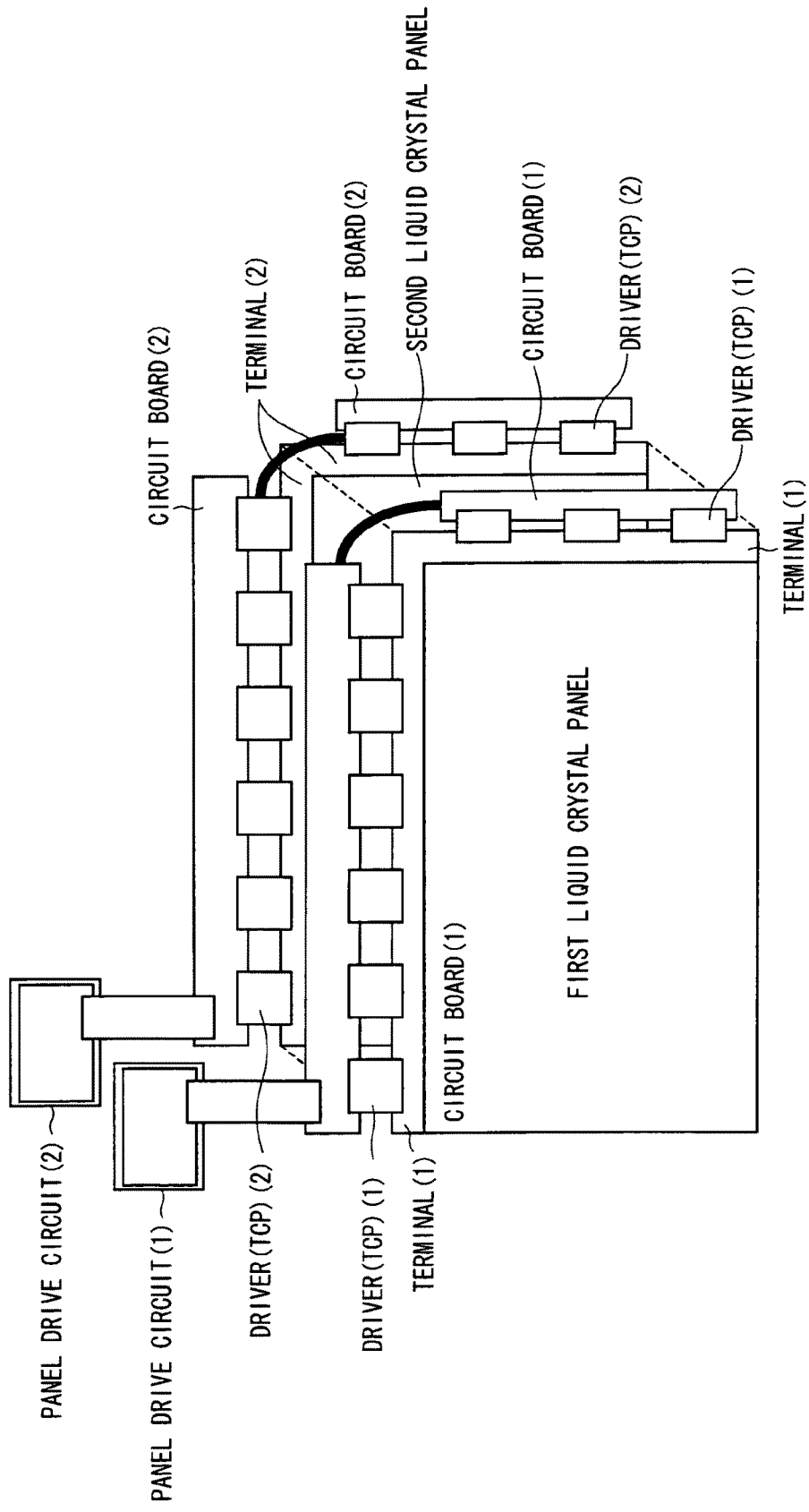
FIG. 5

FIG. 5 illustrates (i) how the first liquid crystal panel is connected with the components of the liquid crystal drive section (1) and (ii) how the second liquid crystal panel is connected with the components of the liquid crystal drive section (2). Note that FIG. 5 omits the polarization plates.

The liquid crystal drive section (1) for driving the first liquid crystal panel includes a panel drive circuit (1), drivers (TCP) (1), and a circuit board (1). The panel drive circuit (1) is connected with a terminal (1) provided to the circuit board (1), via the drivers (TCP) (1). That is, the first liquid crystal panel is connected with the drivers (TCP) (1), the circuit board (1), and the panel drive circuit (1), via the terminal (1).

Note that the liquid crystal drive section (2) for driving the second liquid crystal panel has the same arrangement as that of the liquid crystal drive section (1). As such, descriptions of the liquid crystal drive section (2) are omitted.

The following description deals with an operation of the liquid crystal display apparatus 100 having the arrangement.

A pixel in the first liquid crystal panel is driven in accordance with a display signal. A pixel in the second liquid crystal panel, which pixel corresponds to that in the first liquid crystal panel when these pixels are viewed in a vertical direction, is driven in association with the first liquid crystal panel. While a section (constitutive section 1) constituted by the polarization plate A, the first liquid crystal panel, and the polarization plate B is being in a transmitting state, so does a section (constitutive section 2) constituted by the polarization plate B, the second liquid crystal panel, and the polarization plate C. While the constitutive section 1 is being in a non-transmitting state, so does the constitutive section 2.

The first and second liquid crystal panels may receive identical image signals. Instead, the first and second liquid crystal panels may receive correlated but different signals.

The following description deals with a manufacturing method for the active matrix substrate 230 and the color filter substrate 220.

The manufacturing method for the active matrix substrate 230 is described first.

A metal film, such as a Ti/Al/Ti film stack, is formed on a transparent substrate 210 by sputtering so that scan signal wiring (gate wiring, gate lines, gate voltage lines, or gate bus lines) 201 and auxiliary capacitor wiring 202 are formed as illustrated in FIG. 3. Thereafter, a resist pattern is formed on the films by the photolithography method, and then a dry-etching is carried out by using an etching gas such as chlorine-based gas. Then, the resist is removed. This simultaneously forms the scan signal wiring 201 and the auxiliary capacitor wiring 202 on the transparent substrate 210.

Thereafter, a gate insulating film, an active semiconductor layer, and a low resistance semiconductor layer are formed, all by CVD. The gate insulating film is made of a silicon nitride (SiNx) or other material, the active semiconductor layer is made of amorphous silicon or other material, and the low resistance semiconductor layer is made of amorphous silicon or other material to which for example, phosphorus is doped. Then, in order to form data signal wiring (source wires, source lines, source voltage lines, or source bus lines) 204, drain lead-out wiring 205, and auxiliary capacitor forming electrodes 206, a metal film such as Al/Ti film are formed by sputtering. Thereafter, a resist pattern is formed on the films by the photolithography method, and then a dry-etching is carried out by using an etching gas such as chlorine-based gas. Then, the resist is removed. This simultaneously forms the data signal wiring 204, the drain lead-out wiring 205, and the auxiliary capacitor forming electrodes 206.

An auxiliary capacitor is formed by an arrangement in which a gate insulating film having a thickness of about 4000 angstrom is sandwiched between auxiliary capacitor wiring 202 and an auxiliary capacitor forming electrode 206.

Thereafter, the low resistance semiconductor layer is dry-etched by using for example a chlorine gas to separate a source from a drain. This results in that a TFT element 203 is formed.

Next, an interlayer insulating film 207 is formed by spin coating. The interlayer insulating film 207 is made of an acrylic photosensitive resin or other material. Contact holes (not illustrated) which are used to electrically connect the drain lead-out wiring 205 to the pixel electrodes 208 are formed by the photolithography method. The interlayer insulating film 207 has a thickness of about 3 µm.

Furthermore, pixel electrodes 208 and a vertical alignment film (not illustrated) are formed in this order.

The present embodiment deals with an MVA liquid crystal display apparatus as mentioned earlier and includes a slit pattern 211 in the pixel electrodes 208. The pixel electrodes 208 are made of ITO or other material. Specifically, a film is formed by sputtering, and then a resist pattern is formed by the photolithography method. Etching is then carried out by using an etching solution, such as iron (III) chloride. This results in that a pixel electrode pattern is obtained as illustrated in FIG. 3.

The above process allows an active matrix substrate 230 to be manufactured.

The reference numerals 212a, 212b, 212c, 212d, 212e, and 212f in FIG. 3 indicate electrical connection sections of the slit in the pixel electrode 208. In the electrical connection sections of the slit, alignment is disturbed, thereby resulting in alignment abnormality. In addition to the alignment abnormality, display unevenness is caused due to the following reason. A positive electric potential is applied to the gate wiring to turn the TFT element 203 to an ON state generally on the order of microseconds, whereas a negative electric potential is applied to turn the TFT element 203 to an OFF state generally on the order of milliseconds. Thus, a negative electric potential is predominantly applied to the TFT element 203. As such, if the slits 212a through 212d are disposed on the gate wiring, a negative gate DC component applied to the gate causes impurity ion contained in the liquid crystal to gather together. This is likely to be perceived as display unevenness. On this account, it is necessary that the slits 212a through 212d be disposed so that the gate wiring and the slits 212a through 212d do not overlap. Thus, it is desirable that the slits 212a through 212d be masked with the black matrix 224 as illustrated in FIG. 3.

The following description deals with a manufacturing method for the color filter substrate 220.

The color filter substrate 220 includes the transparent substrate 210. A color filter layer, a counter electrode 223, a vertical alignment film 225, and alignment controlling projections 222 are provided on the transparent substrate 210. The color filter layer includes the color filters 221 of the three primary colors (red, green, and blue) and the black matrix (BM) 224.

After the transparent substrate 210 is coated, by spin coating, with an acrylic photosensitive resin solution of negative-type in which fine carbon particles are dispersed, and is then dried, thereby to form a black photosensitive resin layer. Subsequently, the black photosensitive resin layer is exposed through a photomask and is then developed, thereby to form a black matrix (BM) 224. The BM is formed so as to have an opening for a first colored layer (e.g. red layer), an opening for a second colored layer (e.g. green layer), and an opening for a third colored layer (e.g. blue layer) in areas where the first, second, and third colored layers will be provided, respectively. The openings correspond to the pixel electrodes, respectively. More specifically, as illustrated in FIG. 3, an island shaped BM pattern is formed, and a light blocking section (BM) is formed on the TFT elements 203. The BM pattern carries out light shielding with respect to regions, in the slits 212a to 212d (corresponding to the electrical connection sections of the slits 212a to 212f formed in the pixel electrodes 208), where the alignment abnormality occurs. The light blocking section (BM) prevents an increase in leak current due to photoexcitation made by external light incident on the TFT elements 203.

After the application of an acrylic photosensitive resin solution of negative-type in which a pigment is dispersed by spin coating, drying process is carried out. Then, an exposure and a development are carried out with the use of a photomask, thereby to form a red layer.

Similarly, the second colored layer (e.g. green layer) and the third colored layer (e.g. blue layer) are formed. That completes the manufacture of the color filters 221.

Furthermore, a counter electrode 223 made of a transparent electrode such as ITO is formed by sputtering. The counter electrode 223 is coated with a phenol novolac photosensitive resin solution of positive-type by spin coating, is dried, and is subjected to exposure and development with the use of a photomask, thereby to form a vertical alignment controlling projection 222. Then, columnar spacers (not illustrated) are formed to specify a cell gap for the liquid crystal panel, by carrying out (i) an exposure with the use of a photomask, (ii) an development, and (iii) a hardening with respect to applied acrylic photosensitive resin solution. The resin solution is exposed to light using a photo mask, developed and cured.

Thus, a color filter substrate 220 is formed.

The present embodiment deals with a BM made of resin but may be made of metal instead. The colored layers of the three primary colors are not limited to red, green, and blue. Instead, they may be cyan, magenta, and yellow, and alternatively, they may further include a white layer.

The following description deals with how to manufacture a liquid crystal panel (first and second liquid crystal panels) with the use of a color filter substrate 220 and an active matrix substrate 230.

First, a vertical alignment film 225 is formed on each surface of the color filter substrate 220 and the active matrix substrate 230, which surface comes in contact with liquid crystal. Specifically, each of the substrates 220 and 230 is calcinated for degassing, is cleaned, and then an alignment film is applied. Thereafter, the alignment film is calcinated. After the cleaning of the applied alignment film, a further calcination is carried out for degassing. The vertical alignment film 225 specifies an alignment direction of the liquid crystal 226.

The following description deals with how to seal liquid crystal between the active matrix substrate 230 and the color filter substrate 220.

Liquid crystal may be sealed by a method such as a vacuum filling method. According to the vacuum filling method, the following steps are processed. A thermosetting sealing resin is applied on the periphery of the substrate while securing an injection hole for injecting the liquid crystal. The injection hole is immersed in the liquid crystal in vacuum, and is then vented to atmosphere so that the injection of the liquid crystal can be made. Finally, the injection hole is sealed by, for example, a UV cure resin. Note however that it takes much longer to inject the liquid crystal in a liquid crystal panel having vertical alignment than in a liquid crystal panel having horizontal alignment. Therefore, a drop liquid crystal bonding method is employed here.

A UV cure sealing resin is applied to the periphery of an active matrix substrate, and liquid crystal is dropped onto a color filter substrate by the dropping method. With the use of the drop liquid crystal method, an optimal amount of liquid crystal is dropped regularly inside the sealing so that the liquid crystal secures a desired cell gap.

The pressure inside a combining device is reduced to 1 Pa so that (i) the color filter substrate that has been subjected to the sealing plot and the drop liquid crystal and (ii) the active matrix substrate are combined. After the two substrates are combined under the depressurized state, the pressure is changed back to the atmospheric pressure, so that the seal part is collapsed. This allows a desired gap in the seal part.

The resultant structure with a desired cell gap in the seal part is irradiated with UV radiation by a UV cure device, thereby carrying out a provisional curing of the sealing resin. The structure is then baked so that the sealing resin is finally cured. At this stage, the liquid crystal moves into every corner inside the sealing resin, thereby resulting in that the liquid crystal is fully filled in the cell. Following the completion of the baking, the structure is divided into individual liquid crystal panels. Thus, a liquid crystal panel is completed.

In the present embodiment, the first and second liquid crystal panels are manufactured in the same process.

The following description deals with how to mount first and second liquid crystal panels manufactured by the manufacturing method.

Here, the first and second liquid crystal panels are cleaned, and a polarization plate is combined with each of the liquid crystal panels. Specifically, polarization plates A and B are combined with a front surface and a back surface of the first liquid crystal panel, respectively, as illustrated in FIG. 4. A polarization plate C is attached to a back surface of the second liquid crystal panel. Another layer such as an optical compensation sheet is further provided on each of the polarization plates, where necessary.

Then, drivers (liquid crystal driver LSI) are connected.

Here, the drivers are connected using a TCP (Tape Career Package) method.

For example, an ACF (Anisotropic Conductive Film) is attached to the terminal (1) of the first liquid crystal panel by provisional compression as illustrated in FIG. 5. Thereafter, the TCPs (1) on which the drivers are mounted are punched out of the carrier tape, aligned with a panel terminal electrode, and heated for complete compression/attachment. Thereafter, the input terminals (1) of the TCPs (1) are connected to the circuit board (1) using the ACF. The circuit board (1) is provided to couple the driver TCPs (1) together.

Next, the two panels are combined. The polarization plate B has an adhesive layer on each surface thereof. The surface of the second liquid crystal panel is cleaned, and the laminates of the adhesive layers of the polarizer B on the first liquid crystal panel are peeled off. The first and second liquid crystal panels are precisely aligned, and then combined. Bubbles may be trapped between the panel and the adhesive layer during the combining process. It is therefore desirable to combine the panels in vacuum.

The panels may be combined by an alternative method as follows. An adhesive agent such as an epoxy adhesive agent is applied to the periphery of the panels. This adhesive agent is one which cures at normal temperatures or at a temperature not exceeding the panel's thermal resistance temperature. Plastic spacers are scattered, and, for example, fluorine oil is sealed. Preferred materials are optically isotropic liquids with a refractive index substantially equal to that of a glass substrate and with stability substantially equal to the liquid crystal.

The present embodiment is applicable to cases where the terminal surfaces of the first and second liquid crystal panels are at the same position as illustrated in FIGS. 4 and 5. The terminals may be disposed in any direction with respect to the panel and attached to the panel by any method. For example, they may be fixed mechanically instead of using adhesive.

To reduce the parallax caused by the thickness of the internal glass, the two panels preferably have their inner substrates face each other and have a thickness as thin as possible.

In this regard, when glass substrates are used, thin substrates are straightly available. Feasible substrate thicknesses may vary from one manufacturing line to another and depending on the dimensions of the liquid crystal panels and other conditions. For example, it is possible to adopt glass having a thickness of 0.4 mm as the inner substrate.

Alternatively, the glass may be polished or etched. Glass can be etched by publicly known techniques (see, for example, Japanese Patents No. 3524540 and No. 3523239). For example, a chemical treatment solution such as a 15% aqueous solution of hydrofluoric acid is used. Any parts, such as the terminal surface, which should not be etched, are coated with an acid-proof protective material. The glass is then immersed in the chemical treatment solution for etching.

Following the etching, the protective material is removed. The etching reduces the thickness of the glass to about 0.1 mm to 0.4 mm. After combining the two panels, they are integral with a lighting system referred to as a backlight. This realizes a liquid crystal display apparatus 100.

The following description deals with concrete examples of a lighting system suitable to the present invention. The present invention is however not limited to the arrangement of the lighting system discussed below; any changes may be made where necessary.

Figure 6:
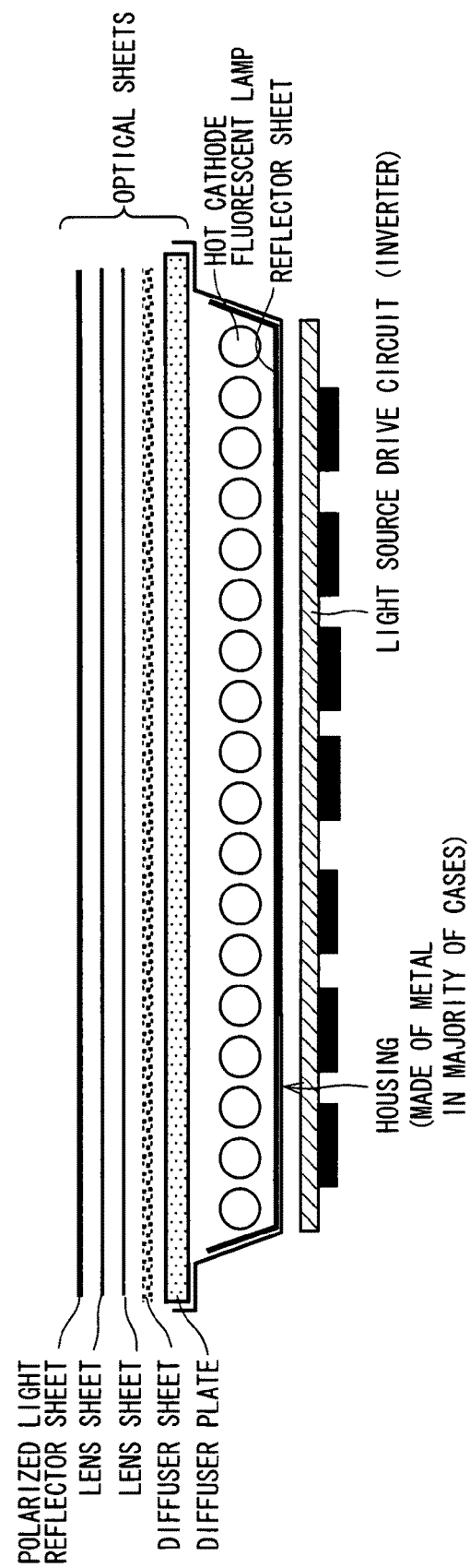
FIG. 6

The liquid crystal display apparatus 100 of the present invention, due to its display principle, needs a backlight capable of providing light amount more than that of a conventional panel. In addition, the absorption for short wavelengths becomes more remarkable. As such, it is necessary that the lighting system adopt a blue light source whose wavelengths are shorter. FIG. 6 illustrates an example of a lighting system which meets these conditions.

Hot cathode fluorescent lamps are used for the liquid crystal display apparatus 100 of the present invention to obtain luminance similar to conventional ones. The hot cathode fluorescent lamp has a feature that it can output about 6 times as much amount of light as a cold cathode fluorescent lamp used under general specifications.

When taking a 37-inch WXGA display as an example of a standard liquid crystal display apparatus, 18 lamps are provided on an aluminum housing. Each of the 18 lamps has an external diameter $\phi$ of 15 mm. The housing includes a white reflecting sheet made of foaming resin for efficient usage of the light emitted backward from the lamps. The power source for the lamps is provided on the back surface of the housing, and receives the commercial power to drive the lamps.

Then, it is necessary that a translucent white resin plate be provided to eliminate images of the lamps in a direct backlighting realized by disposing a plurality of lamps in the housing. In the present example, a plate member, having a thickness of 2 mm, which is made primarily of polycarbonate and exhibits high resistance to wet warping and heat deformation is disposed on the housing for the lamps. Provided on top of the plate member are optical sheets and other sheets, i.e., a diffusing sheet, two lens sheets, and a polarized light reflecting sheet in the order of closing to the top of the plate member. This achieves predetermined optical effects. With these specifications, it is possible that the backlight is about 10 times as bright as typical conventional specifications in which 18 cold cathode fluorescent lamps having an external diameter $\phi$ of 4 mm, two diffusing sheets, and a polarized light reflecting sheet are used. The 37-inch liquid crystal display apparatus of the present invention is hence capable of attaining about 400 cd/m$^2$ luminance.

Note however that the backlight dissipates 5 times as much heat as a conventional backlight. In view of this, there are provided on the back surface of a back chassis (i) a fan urging the heat to be dissipated to air and (ii) a fan forcing air flow to be created.

A mechanical member of the lighting system double as main mechanical members for a whole liquid crystal module. The packaged panels are disposed in the backlight. A liquid crystal display controller including panel drive circuits and signal distributors, a power source for light source, and in some cases a commercial power source is further provided, thereby to complete a liquid crystal module. A frame body for holding the liquid crystal panels is disposed to the liquid crystal module. Thus, a liquid crystal display apparatus of the present invention is completed.

The present embodiment deals with a direct backlighting system using a hot cathode fluorescent lamp. Alternatively, the lighting system, as usage, may be of a projection type or an edge light type. The light source may be cold cathode fluorescent lamps, LEDs, OELs, or electron beam fluorescence tubes. Any optical sheets may be selected for a suitable combination.

The embodiment above deals with the case where the slits are provided in the pixel electrodes of the active matrix substrate, and the alignment controlling projections are provided on the color filter substrate, so as to control the alignment direction of the perpendicular alignment liquid crystal molecules. As another embodiment, the slits and the projections may be transposed. Alternatively, slits may be provided in the electrodes of both substrates. An MVA liquid crystal panel may be used which has alignment controlling projections on the surfaces of the electrodes of both of the substrates.

Besides the MVA type, a pair of vertical alignment films may be used which specify orthogonal pre-tilt directions (alignment treatment directions). Alternatively, VA mode in which liquid crystal molecules are in twist alignment may be used. VATN type, mentioned earlier, may also be used. The VATN type is preferable in the present invention since contrast is not reduced by the light leaked from the part where the alignment controlling projections are provided. The pre-tilt is formed by, for example, an optical alignment.

In the liquid crystal display apparatus 100 having the arrangement, the two liquid crystal panels are controlled and driven to output respective video images in accordance with a single video source.

The following describes how each of the liquid crystal panels carries out a display operation in a case where a video source is a so-called interlaced video signal in which one frame is made up of two fields.

In each of the liquid crystal panels, a luminance is maintained at a constant level during one field period because each of the liquid crystal panels is of a hold-type. Therefore, it is necessary that liquid crystal on a line scanned during a preceding field period has a transmittance of 0 (i.e., it is necessary to display black). Therefore, in a case where a liquid crystal panel is driven by the interlaced method, scanning is carried out with respect to all lines (i.e., two types of scanning ((i) scanning of every other line with regard to a supplied video signal and (ii) scanning of every other line for black displaying) are carried out).

First, the following describes a case where the first liquid crystal panel and the second liquid crystal panel are driven by the interlaced method.

(a) and (b) of FIG. 7 show lines to be scanned in each field in a case where the first liquid crystal panel and the second liquid crystal panel are driven by the interlaced method. In FIG. 7, circled numbers indicate an order in which a video signal is scanned in a video image corresponding to one frame. In FIG. 7, the number of lines to be scanned is assumed to be 8, for convenience of explanation.

In an even-numbered field, as shown in (a) of FIG. 7, even-numbered lines are scanned in the first liquid crystal panel and in the second liquid crystal panel. In an odd-numbered field, as shown in (b) of FIG. 7, odd-numbered lines are scanned in the first liquid crystal panel and in the second liquid crystal panel.

A video image corresponding to one frame, such as that shown in FIG. 8(*a*), is displayed in a case where the even-numbered lines and the odd-numbered lines are scanned.

FIG. 8(*a*) is a view illustrating a video image to be displayed. FIG. 8(*b*) is a view illustrating video images displayed in an even-numbered field by scanned lines shown in (a) of FIG. 7. FIG. 8(*c*) is a view illustrating video images displayed in an odd-numbered field by scanned lines shown in (b) of FIG. 7. Note that FIG. 8(*b*) and FIG. 8(*c*) are views modified for clearly showing scanned states in each of the fields. That is, each of display lines displays, in reality, a dot or a horizontal line because an image is displayed every other line. However, FIG. 8(*a*) and FIG. 8(*b*) assume image display in which display lines and black display lines alternate every few lines. Therefore, a contour of a circle in the video image is displayed over several lines.

In a case where the first liquid crystal panel and the second liquid crystal panel are driven by the interlaced method as is described above, black display lines of each of the liquid crystal panels function like slits. This causes interference between the liquid crystal panels, thereby leading to a problem of interference fringes.

In order to address the problem, it is conceivable that (i) one of the combined two liquid crystal panels is driven by the interlaced method and (ii) the other one of the combined two liquid crystal panels is driven by a non-interlaced method, i.e., by a progressive method. It is possible to adopt, as a method for driving a liquid crystal panel by the progressive method, a method such as that disclosed in Japanese Unexamined Patent Application Publication, Tokukai, No. 2004-357253 A.

The following describes a case where the first liquid crystal panel is driven by the interlaced method and the second liquid crystal panel is driven by the progressive method.

(a) and (b) of FIG. 9 show lines to be scanned in each field in a case where the first liquid crystal panel is driven by the interlaced method and the second liquid crystal panel is driven by the progressive method. In FIG. 9, circled numbers indicate an order in which a video signal is scanned in a video image corresponding to one frame. In FIG. 9, the number of lines to be scanned is assumed to be 8, for convenience of explanation.

In an even-numbered field, as shown in (a) of FIG. 9, even-numbered lines are scanned in the first liquid crystal panel, whereas all lines are scanned in the second liquid crystal panel.

In an odd-numbered field, as shown in (b) of FIG. 9, odd-numbered lines are scanned in the first liquid crystal panel, whereas all the lines are scanned in the second liquid crystal panel.

In summary, all the lines of the first liquid crystal panel are scanned in two fields, i.e., an even-numbered field and an odd-numbered field, and all the lines of the second liquid crystal panel are scanned in each of the two fields. This causes a video image corresponding to one frame to be displayed as is illustrated in FIG. 10(*a*).

FIG. 10(*a*) is a view illustrating a video image to be displayed. FIG. 10(*b*) is a view illustrating video images displayed in an even-numbered field by scanned lines shown in (a) of FIG. 9. FIG. 10(*c*) is a view illustrating video images displayed in an odd-numbered field by scanned lines shown in (b) of FIG. 9. Note that FIG. 10(*b*) and FIG. 10(*c*) are views modified for clearly showing scanned states in each of the fields. That is, each of display lines displays, in reality, a dot or a horizontal line because an image is displayed every other line. However, FIG. 10(*a*) and FIG. 10(*b*) assume image display in which display lines and black display lines alternate every few lines. Therefore, a contour of a circle in the video image is displayed over several lines.

Thus, the first liquid crystal panel is driven by the interlaced method and the second liquid crystal panel is driven by the progressive method. It follows that only a single liquid crystal panel is driven by the interlaced method in the liquid crystal display apparatus 100.

The display panel driven by the progressive method displays, during one field period, video images even on the lines which do not contribute to image display on the display panel driven by the interlaced method. Accordingly, there exists no part functioning as a slit (see the second liquid crystal panel illustrated in FIG. 10(*b*) and FIG. 10(*c*)), unlike a display panel driven by the interlaced method.

This eliminates an occurrence of interference fringes which are caused in a case where a plurality of liquid crystal panels driven by the interlaced method are combined, even if the second liquid crystal panel driven by the progressive method is combined with the first liquid crystal panel driven by the interlaced method. This eliminates a deterioration in display quality due to the interference fringes. As a result, it is possible to improve display quality.

Further, one frame is made up of two fields in the first liquid crystal panel driven by the interlaced method. Therefore, it is possible to arrange the second liquid crystal panel, driven by the progressive method, so that information corresponding to one field of one frame in the first liquid crystal panel driven by the interlaced method is displayed on lines, by two lines, during a ½ frame period (doubler display).

The doubler display can be realized by a method such as that disclosed in Japanese Unexamined Patent Application Publication, Tokukaihei, No. 3-94589 A.

The following describes a concrete example of the doubler display, with reference to FIG. 11, and FIG. 12(*a*) through FIG. 12(*c*).

(a) and (b) of FIG. 11 show lines to be scanned in each field in a case where the first liquid crystal panel is driven by the interlaced method and the second liquid crystal panel is driven by the progressive method. In FIG. 11, circled numbers indicate an order in which a video signal is scanned in a video image corresponding to one frame. In FIG. 11, the number of lines to be scanned is assumed to be 8, for convenience of explanation.

In an even-numbered field, as shown in (a) of FIG. 11, even-numbered lines are scanned in the first liquid crystal panel, whereas each even-numbered line is scanned twice in the second liquid crystal panel.

In an odd-numbered field, as shown in (b) of FIG. 11, odd-numbered lines are scanned in the first liquid crystal panel, whereas each odd-numbered line is scanned twice in the second liquid crystal panel.

In summary, all the lines of the first liquid crystal panel are scanned in two fields, i.e., an even-numbered field and an odd-numbered field, and all the lines of the second liquid crystal panel are scanned in each of the two fields. This causes a video image corresponding to one frame to be displayed as is illustrated in FIG. 12(*a*).

FIG. 12(*a*) is a view illustrating a video image to be displayed. FIG. 12(*b*) is a view illustrating video images displayed in an even-numbered field by scanned lines shown in (a) of FIG. 11. FIG. 12(*c*) is a view illustrating video images displayed in an odd-numbered field by scanned lines shown in (b) of FIG. 11. Note that FIG. 12(*b*) and FIG. 12(*c*) are views modified for clearly showing scanned states in each of the fields. That is, each of display lines displays, in reality, a dot or a horizontal line because an image is displayed every other line. However, FIG. 12(*a*) and FIG. 12(*b*) assume image display in which display lines and black display lines alternate every few lines. Therefore, a contour of a circle in the video image is displayed over several lines.

According to the doubler display, two lines in the second liquid crystal panel correspond to a line functioning as a slit in the first liquid crystal panel (see (a) and (b) of FIG. 11). Therefore, in a case where the first liquid crystal panel is a front panel, two identical video images are displayed on respective two lines of the second liquid crystal panel which are viewed via a corresponding slit of the first liquid crystal panel.

Further, two lines in the second liquid crystal panel correspond to a line functioning as a slit in the first liquid crystal panel. As a result, there is no need to greatly improve the accuracy of alignment in a case where two liquid crystal panels are combined with each other.

The following describes a drive circuit for driving the liquid crystal display apparatus 100 described in the present embodiment, with reference to FIGS. 13 through 16. The following assumes that the first liquid crystal panel is driven by the interlaced method and the second liquid crystal panel is driven by the progressive method.

The following describes timing controllers and IP converting sections. The timing controllers and the IP converting sections are common components among drive circuits illustrated in FIGS. 13 through 16.

Each of video signal distributing sections is a block for distributing signals supplied as video signals to the first liquid crystal panel and the second liquid crystal panel.

Each of timing controllers is a block for supplying a timing pulse for driving a corresponding liquid crystal panel. The timing controller can include functions such as gradation conversion and overdrive on a liquid crystal module side.

Each of the IP converting sections is a block which carries out conversions such as A/D conversion, scaling, IP conversion, gradation conversion, and color conversion with respect to a video signal supplied from a tuner, or with respect to an externally supplied video signal. Each of the IP converting sections carries out a progressive conversion (doubler conversion).

In FIG. 15, a drive circuit includes PP converting sections instead of the IP converting sections. Each of the PP converting sections is a block that carries out conversions such as A/D conversion, scaling, gradation conversion, and color conversion with respect to an as-supplied progressive video signal.

In FIGS. 13 through 16, it is also possible to cause each liquid crystal panel to be driven by the doubler method. In this case, it is necessary for the IP converting sections or the PP converting sections to be replaced with doubler sections each of which carries out signal processing so that the liquid crystal panels are driven by the doubler method. The following describes an example of a drive circuit utilizing the IP converting sections or the PP converting sections.

According to FIG. 13, control signals are supplied to each of the first and second liquid crystal panels as follows. First, supplied video signals are distributed by a video signal distributor into video signals for the first liquid crystal panel and video signals for the second liquid crystal panel. The video signals for the first liquid crystal panel are transmitted to a first signal processing circuit 101 while the video signals for the second liquid crystal panel are transmitted to a second signal processing circuit 102. The first and second signal processing circuits 101 and 102 carry out predetermined signal processing with respect to the respective supplied video signals, and then supply, as control signals, the video signals subjected to the signal processing to drivers of the respective liquid crystal panels.

In FIG. 13, signals supplied as the video signals are progressive video signals. Therefore, supplied progressive video signal are converted into respective interlaced video signals by a PI converting section for converting progressive video signals into interlaced video signals, and then distributed by a video signal distributing section to the first signal processing circuit 101 and the second signal processing circuit 102.

The first signal processing circuit 101 is a circuit for generating (i) a signal to be supplied to a source driver (S driver) of the first liquid crystal panel and (ii) a signal to be supplied to a gate driver (G driver) of the first liquid crystal panel. The first signal processing circuit 101 includes an IP converting section and a timing controller.

In the first signal processing circuit 101, the supplied interlaced video signals are converted into progressive video signals by the IP converting section, and then supplied, at an appropriate timing, to the source driver of the first liquid crystal panel by the timing controller. Thus, the first signal processing circuit 101 processes video signals so that the supplied video signals can be properly displayed on the first liquid crystal panel. This causes the first liquid crystal panel to be driven by the progressive method.

The second signal processing circuit 102 is a circuit for generating (i) a signal to be supplied to a source driver (S driver) of the second liquid crystal panel and (ii) a signal to be supplied to a gate driver (G driver) of the second liquid crystal panel. The second signal processing circuit 102 includes an IP converting section and a timing controller.

In the second signal processing circuit 102, the supplied interlaced video signals are converted into progressive video signals by the IP converting section, and then supplied, at an appropriate timing, to the source driver of the second liquid crystal panel by the timing controller. Thus, the second signal processing circuit 102 processes video signals so that the supplied video signals can be properly displayed on the second liquid crystal panel. This causes the second liquid crystal panel to be driven by the progressive method.

As described above, both the first liquid crystal panel and the second liquid crystal panel are driven by the progressive method. This eliminates a deterioration in display quality due to interference fringes caused in a case where both liquid crystal panels are driven by the interlaced method. As a result, it is possible to improve display quality.

Note that it is possible that one of the first and second liquid crystal panels is driven by the progressive method while the other one of the first and second liquid crystal panels is driven by the doubler method. In this case, it is necessary that an IP converting section in a signal processing circuit of the other one of the first and second liquid crystal panels is replaced with a signal processing circuit for driving the liquid crystal panel by the doubler method.

In FIG. 14, signals supplied as video signals are progressive video signals, as is the case with the drive circuit illustrated in FIG. 13. Unlike the drive circuit illustrated in FIG. 13, in the drive circuit illustrated in FIG. 14, a first signal processing circuit 103 and a second signal processing circuit 104 include respective PI converting sections. That is, the drive circuit illustrated in FIG. 14 is different from that of FIG. 13 in that PI conversion is carried out with respect to video signals distributed by a video signal distributing section.

Note however that the drive circuit illustrated in FIG. 14 and that of FIG. 13 operate on basically the same operating principle. That is, the drive circuit illustrated in FIG. 14 is an example of a drive circuit in which the PI converting sections are provided on a liquid crystal module side.

Accordingly, the drive circuit illustrated in FIG. 14 causes the first and second liquid crystal panels to be driven by the progressive method.

As is the case with the drive circuit illustrated in FIG. 13, this eliminates a deterioration in display quality due to interference fringes caused in a case where both first and second liquid crystal panels are driven by the interlaced method. As a result, it is possible to improve display quality.

As is the case with the drive circuit illustrated in FIG. 13, the drive circuit illustrated in FIG. 14 can be arranged so that one of the first and second liquid crystal panels is driven by the progressive method while the other one of the first and second liquid crystal panels is driven by the doubler method. In this case, it is necessary that an IP converting section in a signal processing circuit of the other one of the first and second liquid crystal panels is replaced with a signal processing circuit for driving the liquid crystal panel by the doubler method.

In FIG. 15, signals supplied as video signals are progressive video signals, as is the case with the drive circuit illustrated in FIGS. 13 and 14.

The drive circuit illustrated in FIG. 15 is different from those of FIGS. 13 and 14 in that progressive video signals are distributed, as they are, to signal processing circuits since the drive circuit illustrated in FIG. 15 does not include any PI converting section for converting a progressive video signal into an interlaced video signal. That is, the drive circuit illustrated in FIG. 15 is similar to that of FIG. 14 in that video signals distributed by the video signal distributing section are progressive video signals but is different in that the progressive video signals are, without being converted into respective interlaced video signals, subjected to conversions such as A/D conversion, scaling, gradation conversion, and color conversion by respective PP converting sections.

However, the drive circuit illustrated in FIG. 15 and those illustrated in FIGS. 13 and 14 operate on basically the same operating principle.

Accordingly, the drive circuit illustrated in FIG. 15 causes the first and second liquid crystal panels to be driven by the progressive method.

As is the case with the drive circuits illustrated in FIGS. 13 and 14, this eliminates a deterioration in display quality due to interference fringes caused in a case where both first and second liquid crystal panels are driven by the interlaced method. As a result, it is possible to improve display quality.

As is the case with the drive circuits illustrated in FIGS. 13 and 14, the drive circuit illustrated in FIG. 15 can be arranged so that one of the first and second liquid crystal panels is driven by the progressive method while the other one is driven by the doubler method. In this case, it is necessary that a PP converting section in a signal processing circuit of the other one of the first and second liquid crystal panels is replaced with a signal processing circuit for driving the liquid crystal panel by the doubler method.

Unlike the drive circuits illustrated in FIGS. 13 through 15, in FIG. 16, signals supplied as video signals are interlaced video signals.

Therefore, in the drive circuit illustrated in FIG. 16, a video signal distributing section, a first signal processing circuit 107 and a second signal processing circuit 108 have the same arrangements as and operate in the same way as the video signal distributing section, the first signal processing circuit 101, and the second signal processing circuit 102, which are illustrated in FIG. 13, respectively.

As described above, the drive circuit illustrated in FIG. 16 causes the first and second liquid crystal panels to be driven by the progressive method.

As is the case with the drive circuits illustrated in FIGS. 13 through 15, this eliminates a deterioration in display quality due to interference fringes caused in a case where both first and second liquid crystal panels are driven by the interlaced method. As a result, it is possible to improve display quality.

As is the case with the drive circuits illustrated in FIGS. 13 through 15, the drive circuit illustrated in FIG. 16 can be also arranged so that the one of the first and second liquid crystal panels is driven by the progressive method while the other one of the first and second liquid crystal panels is driven by the doubler method. In this case, it is necessary that a PP converting section in a signal processing circuit of the other one of the first and second liquid crystal panels is replaced with a signal processing circuit for driving the liquid crystal panel by the doubler method.

The above description has dealt with cases where drive circuits illustrated in FIGS. 13 through 16 each cause a corresponding liquid crystal panel to be driven by the progressive method. However, in a corresponding signal processing circuit of any one of the drive circuits illustrated in FIGS. 13 through 16, IP converting sections do not necessarily convert an interlaced video signal into a progressive video signal. Instead, the IP converting sections can carry out conversion such as A/D conversion, scaling, gradation conversion, and color conversion with respect to an interlaced video signal so as to output the interlaced signal thus converted.

In this case, it is possible in the drive circuits illustrated in FIGS. 13 through 16 that (i) the first liquid crystal panel is driven by the interlaced method and the second liquid crystal panel is driven by the progressive method or the doubler method, or (ii) the first liquid crystal panel is driven by the progressive method or the doubler method and the second liquid crystal panel is driven by the interlaced method.

In particular, the drive circuit illustrated in FIG. 16 receives interlaced video signals as video signals. Accordingly, it is sufficient that only one of the first and second signal processing circuits 107 and 108 converts supplied interlaced video signals into respective progressive video signals. This allows reductions in circuit size and in manufacturing cost.

Video signals taken with a video camcorder which is used commonly in a broadcasting industry are interlaced video signals. Therefore, the drive circuit illustrated in FIG. 16 allows one of the first and second liquid crystal panels to display a video image, as it is, which has been taken with a video camcorder. In this case, it is possible to suppress interference fringes which are likely to occur in a case where both liquid crystal panels are driven by the interlaced method, by causing the other one of the first and second liquid crystal panels to be driven by the progressive method or by the doubler method. This makes it possible to improve display quality.

As needed, a delay section is included in an IP converting section or a PP converting section so that the timing at which the first liquid crystal panel is driven is in sync with the timing at which the second liquid crystal panel is driven, even in a case, for example, one of combined liquid crystal panels is driven by the interlaced method and the other one of the combined liquid crystal panels is driven by the progressive method (or by the doubler method).

Note that the present invention is applicable to an arrangement in which three or more liquid crystal panels are combined with each other. In this case, it is necessary that one of the combined three liquid crystal panels is driven by the interlaced method while the others of the combined three liquid crystal panels are driven by the progressive method in which a video image corresponding to one frame is displayed in one field.

Further, the display panels of the present invention are not limited to liquid crystal panels, but can be transmissive and hold-type display panels.

The following description deals with a television receiver which is an example of electronic devices to which the liquid crystal display of the present invention is applied, with reference to FIGS. 17 through 19.

FIG. 17 shows a circuit block of a liquid crystal display apparatus 601 for a television receiver.

A liquid crystal display apparatus 601 includes, a Y/C separation circuit 500, a video chroma circuit 501, an A/D converter 502, a liquid crystal controller 503, a liquid crystal panel 504, a backlight drive circuit 505, a backlight 506, a microcomputer 507, and a gray level circuit 508, as illustrated in FIG. 17.

The liquid crystal panel 504 has a double panel structure including a first liquid crystal panel and a second liquid crystal panel. The panels may be of any of the structures described in the foregoing embodiments.

In the above-arranged liquid crystal display apparatus 601, first, an input video signal (television signal) is supplied to the Y/C separation circuit 500 so as to be separated into a luminance signal and a color signal. The luminance signal and the color signal are converted to analog R, G, and B signals (the three primary colors of light), in the video chroma circuit 501. Furthermore, these analog RGB signals are converted to digital RGB signals by the A/D converter 502, which digital RGB signals are supplied to the liquid crystal controller 503.

The liquid crystal panel 504 receives (i) each of the digital RGB signals from the liquid crystal controller 503 at predetermined timing and (ii) respective RGB gray level voltages from the gray level circuit 508. Based on the digital RGB signals and the RGB gray level voltages, the panel 504 carries out an image display. The whole system, including the processes, is controlled by the microcomputer 507.

Various video signals are displayable, which include a video signal based on television broadcast, a video signal representing images captured on a camera, or a video signal supplied over the Internet.

Furthermore, a tuner section 600 illustrated in FIG. 18 receives television broadcast and outputs a video signal. A liquid crystal display apparatus 601 carries out image (video) display based on the video signal supplied from the tuner section 600.

When a liquid crystal display apparatus having the above arrangement is intended to be a television receiver, the liquid crystal display apparatus 601 is packaged so as to be sandwiched between a first housing 301 and a second housing 306, as illustrated in FIG. 19.

The first housing 301 includes an opening 301a which transmits the video so that the video is displayed on the liquid crystal display apparatus 601.

The second housing 306 provides a cover for the backside of the liquid crystal display apparatus 601. The housing 306 is provided with an operation circuit 305 for operation of the liquid crystal display apparatus 601. A supporting member 308 is attached at the bottom of the housing 306.

As described above, when a liquid crystal display apparatus of the present invention is used as a display apparatus in a television receiver having the above arrangement, it is possible to carry out an extremely high quality image display with high contrast and without moire.

As for an electronic device except the television receiver, a liquid crystal display apparatus of the present invention is applicable to a monitoring device which is used in the industry such as a broadcasting industry.

Further, the liquid crystal display apparatus can be used as a business-oriented display apparatus used in an advertisement display, an information display, or amusements.

The present embodiment has described the liquid crystal display apparatus as a display apparatus. However, the display apparatus of the present embodiment is not limited to this, but can be any apparatus, provided that the apparatus can display an image by two or more display panels which are combined with each other.

The present invention is not limited to the embodiments described above, and may be modified within the scope of the claims. An embodiment derived from a proper combination of technical means disclosed in different embodiments is also encompassed in the technical scope of the present invention.

Industrial Applicability

The display apparatus of the present invention is applicable to devices such as electronic devices, a television receiver, and a monitoring device used in the broadcasting industry each of which is required to output a video image with high display quality in a case where two or more liquid crystal panels are combined with each other.

The invention claimed is:

1. A display apparatus in which two or more transmissive display panels are combined with each other, each of which displays a video image in accordance with an identical video source, wherein
   one of the two or more transmissive display panels is configured to generate an interlaced video image, the interlaced video image corresponds to one frame including a plurality of fields, the others of the two or more transmissive display panels are configured to generate a progressive video image, the progressive video image corresponds to one frame including one field, and a gray level circuit is configured to interface with the transmissive display panels to display the interlaced and progressive video images.

2. The display apparatus as set forth in claim 1 wherein,
   if one frame is made up of N fields in the one of the two or more transmissive display panels, information corresponding to one field of one frame in the one of the two or more transmissive display panels is supplied, in a 1/N frame period by N lines, to lines of each of the others of the two or more transmissive display panels.

3. The display apparatus as set forth in claim 1, further comprising;
   a signal conversion process or, and
   if the video source is a video signal complying with an interlaced method in which one frame is made up of a plurality of fields, the signal conversion processor is configured to convert the video signal into a second video signal complying with a progressive method to be supplied to each of the others of the two or more transmissive display panels.

4. The display apparatus as set forth in claim 3 wherein,
   if one frame of the second video signal is made up of N fields,
   the signal conversion process or is configured to supply the second video signal, in a 1/N frame period by N lines, to each of the others of the two or more transmissive display panels.

5. The display apparatus as set forth in claim 1, wherein:
   each of the two or more transmissive display panels is a liquid crystal panel, and the display apparatus includes,
   polarized light absorbing layers, each of the two or more liquid crystal panels is sandwiched between corresponding two of the polarized light absorbing layers which form crossed Nicols.

6. An electronic device comprising:
   the display apparatus recited in claim 1.

7. The display apparatus of claim 1, wherein the others of the two or more transmissive display panels are configured to produce a first video image on even lines of the others of the two or more transmissive display panels in a first field and are configured to produce a second video image on odd lines of the others of the two or more transmissive display panels in a second field, and the one of the two or more transmissive display panels is configured to produce a third video image on odd and even lines of the one of the two or more transmissive display panels in the first field.

8. The display apparatus of claim 1, wherein the one of the two or more transmissive display panels is configured to produce a first video image on odd and even lines of the one of the two or more transmissive display panels in a first field.

* * * * *